United States Patent
Davis et al.

(10) Patent No.: US 10,582,012 B2
(45) Date of Patent: Mar. 3, 2020

(54) ADAPTIVE DATA TRANSFER OPTIMIZATION

(71) Applicant: Oracle International Corporation, Redwood Shores, CA (US)

(72) Inventors: Edmund A. Davis, San Mateo, CA (US); Brian C. Rowles, Acton, MA (US)

(73) Assignee: Oracle International Corporation, Redwood Shores, CA (US)

( * ) Notice: Subject to any disclaimer, the term of this patent is extended or adjusted under 35 U.S.C. 154(b) by 741 days.

(21) Appl. No.: 15/157,758

(22) Filed: May 18, 2016

(65) Prior Publication Data

US 2017/0111477 A1 Apr. 20, 2017

Related U.S. Application Data

(60) Provisional application No. 62/242,498, filed on Oct. 16, 2015.

(51) Int. Cl.
| | |
|---|---|
| *H04L 29/06* | (2006.01) |
| *H04L 12/26* | (2006.01) |
| *H04L 12/805* | (2013.01) |

(52) U.S. Cl.
CPC ............ *H04L 67/42* (2013.01); *H04L 43/16* (2013.01); *H04L 43/0864* (2013.01); *H04L 47/36* (2013.01)

(58) Field of Classification Search
None
See application file for complete search history.

(56) References Cited

U.S. PATENT DOCUMENTS

| | | | |
|---|---|---|---|
| 5,550,971 A | 8/1996 | Brunner et al. | |
| 6,058,389 A | 5/2000 | Chandra et al. | |
| 6,097,382 A | 8/2000 | Rosen et al. | |
| 6,115,715 A | 9/2000 | Traversat et al. | |
| 6,266,058 B1 | 7/2001 | Meyer | |
| 6,631,497 B1 | 10/2003 | Jamshidi et al. | |
| 6,631,519 B1 | 10/2003 | Nicholson et al. | |
| 6,813,244 B1 * | 11/2004 | He ...................... | H04L 41/046 370/235 |
| 6,922,200 B1 | 7/2005 | Marques | |

(Continued)

FOREIGN PATENT DOCUMENTS

| | | |
|---|---|---|
| JP | 2014142755 A | 8/2014 |
| WO | 2016049626 A1 | 3/2016 |

OTHER PUBLICATIONS

U.S. Appl. No. 14/861,834, filed Sep. 22, 2015.

(Continued)

*Primary Examiner* — Brian Whipple
(74) *Attorney, Agent, or Firm* — Potomac Law Group, PLLC

(57) ABSTRACT

A system transfers data for an application. The system determines a per request data size, and sends a data transfer request for transferring a portion of the data from a client to a server according to the per request data size, where the server is configured to host the application. The system then receives a response from the server for the data transfer request, and adjusts the per request data size based on a measure of the data transfer request and the response. The adjusted per request data size is configured to be used for sending other portions of the data from the client to the server.

20 Claims, 14 Drawing Sheets

(56) References Cited

U.S. PATENT DOCUMENTS

| | | |
|---|---|---|
| 6,990,653 B1 | 1/2006 | Burd et al. |
| 7,062,502 B1 | 6/2006 | Kesler |
| 7,111,307 B1 | 9/2006 | Wang |
| 7,116,310 B1 | 10/2006 | Evans et al. |
| 7,203,678 B1 | 4/2007 | Petropoulos et al. |
| 7,206,805 B1 | 4/2007 | McLaughlin |
| 7,337,434 B2 | 2/2008 | Nichols et al. |
| 7,395,355 B2 | 7/2008 | Afergan et al. |
| 7,428,725 B2 | 9/2008 | Niyogi et al. |
| 7,430,732 B2 | 9/2008 | Cwalina et al. |
| 7,464,297 B2 | 12/2008 | Potter, IV et al. |
| 7,546,576 B2 | 6/2009 | Egli |
| 7,546,602 B2 | 6/2009 | Hejlsberg et al. |
| 7,577,909 B2 | 8/2009 | Harriger et al. |
| 7,577,934 B2 | 8/2009 | Anonsen et al. |
| 7,610,575 B2 | 10/2009 | Sproule |
| 7,650,594 B2 | 1/2010 | Nattinger |
| 7,707,553 B2 | 4/2010 | Rogues et al. |
| 7,730,427 B2 | 6/2010 | Peters |
| 7,735,068 B2 | 6/2010 | Siddaramappa et al. |
| 7,757,177 B1 | 7/2010 | Bohm et al. |
| 7,757,207 B2 | 7/2010 | Yan et al. |
| 7,769,810 B1 | 8/2010 | Kaufman |
| 7,779,383 B2 | 8/2010 | Bomhoevd et al. |
| 7,802,294 B2 | 9/2010 | Perlin et al. |
| 7,818,718 B2 | 10/2010 | Wedel et al. |
| 7,849,447 B1 | 12/2010 | Karis et al. |
| 7,861,121 B2 | 12/2010 | Wang |
| 7,917,888 B2 | 3/2011 | Chong et al. |
| 7,926,027 B2 | 4/2011 | Chen et al. |
| 7,937,364 B1 | 5/2011 | Chandrasekaran et al. |
| 7,949,776 B2 | 5/2011 | Swan |
| 8,032,634 B1 | 10/2011 | Eppstein et al. |
| 8,166,387 B2 | 4/2012 | Morrison et al. |
| 8,219,970 B2 | 7/2012 | Neil et al. |
| 8,364,968 B2 | 1/2013 | Corcoran et al. |
| 8,417,728 B1 | 4/2013 | Anders et al. |
| 8,452,567 B1 | 5/2013 | Sullivan et al. |
| 8,578,282 B2 | 11/2013 | Boillot |
| 8,612,933 B1 | 12/2013 | Gill et al. |
| 8,676,723 B2 | 3/2014 | Jung |
| 8,745,641 B1 | 6/2014 | Coker |
| 8,812,546 B1 | 8/2014 | Cornali |
| 8,813,028 B2 | 8/2014 | Farooqi |
| 8,843,450 B1 | 9/2014 | Shioyama et al. |
| 8,924,355 B1 | 12/2014 | Kundzich et al. |
| 8,949,776 B2 | 2/2015 | Feber |
| 8,954,553 B1 | 2/2015 | Colton et al. |
| 8,954,732 B1 | 2/2015 | Watsen et al. |
| 8,972,929 B2 | 3/2015 | Fahmy |
| 8,977,693 B2 | 3/2015 | Gidugu |
| 8,984,581 B2 | 3/2015 | Luna et al. |
| 8,990,765 B2 | 3/2015 | Kulkarni et al. |
| 9,047,166 B2 | 6/2015 | Nishio et al. |
| 9,047,404 B1 | 6/2015 | Jibaly et al. |
| 9,047,414 B1 | 6/2015 | Matyjek |
| 9,054,919 B2 | 6/2015 | Kiang et al. |
| 9,069,375 B2 | 6/2015 | Padmavilasom |
| 9,077,770 B2 | 7/2015 | Redpath |
| 9,105,046 B1 | 8/2015 | Dias et al. |
| 9,158,518 B2 | 10/2015 | Brown et al. |
| 9,223,684 B2 | 12/2015 | Gittelman et al. |
| 9,258,668 B2 | 2/2016 | Mall et al. |
| 9,258,669 B2 | 2/2016 | Nyisztor et al. |
| 9,292,502 B2 | 3/2016 | Karlsen |
| 9,324,067 B2 | 4/2016 | Os et al. |
| 9,344,497 B2 | 5/2016 | Arthursson et al. |
| 9,448,790 B2 | 9/2016 | Collison et al. |
| 9,536,080 B2 | 1/2017 | Kerr et al. |
| 9,772,822 B2 | 9/2017 | Narayanan et al. |
| 9,772,987 B2 | 9/2017 | Davis et al. |
| 9,826,045 B2 | 11/2017 | Straub et al. |
| 9,911,123 B2 | 3/2018 | Os et al. |
| 9,992,268 B2 | 6/2018 | Atsatt et al. |
| 10,048,948 B2 | 8/2018 | Davis et al. |
| 10,073,825 B2 | 9/2018 | Davis et al. |
| 2002/0129175 A1 | 9/2002 | Banavar et al. |
| 2002/0174010 A1 | 11/2002 | Rice |
| 2003/0177282 A1 | 9/2003 | Hejlsberg et al. |
| 2004/0010621 A1 | 1/2004 | Afergan et al. |
| 2004/0034616 A1 | 2/2004 | Witkowski et al. |
| 2004/0046789 A1 | 3/2004 | Inanoria |
| 2004/0073565 A1 | 4/2004 | Kaufman et al. |
| 2004/0133876 A1 | 7/2004 | Sproule |
| 2004/0205149 A1 | 10/2004 | Dillon et al. |
| 2004/0240444 A1 | 12/2004 | Matthews et al. |
| 2004/0250257 A1 | 12/2004 | Koutyrine et al. |
| 2005/0172261 A1 | 8/2005 | Yuknewicz et al. |
| 2005/0183059 A1 | 8/2005 | Loksh et al. |
| 2005/0273759 A1 | 12/2005 | Lucassen et al. |
| 2006/0048097 A1 | 3/2006 | Doshi |
| 2006/0059350 A1 | 3/2006 | Cantwell et al. |
| 2006/0112123 A1* | 5/2006 | Clark ................ G06F 17/246 |
| 2006/0112398 A1 | 5/2006 | Mukkamala et al. |
| 2006/0173951 A1 | 8/2006 | Arteaga et al. |
| 2006/0174334 A1 | 8/2006 | Perlin et al. |
| 2006/0206890 A1 | 9/2006 | Shenfield et al. |
| 2006/0230078 A1 | 10/2006 | McConaughy et al. |
| 2006/0236302 A1 | 10/2006 | Bateman et al. |
| 2006/0291398 A1 | 12/2006 | Potter, IV et al. |
| 2006/0294333 A1 | 12/2006 | Michaylov et al. |
| 2007/0016804 A1 | 1/2007 | Kemshall |
| 2007/0067313 A1 | 3/2007 | Garza et al. |
| 2007/0190978 A1 | 8/2007 | White et al. |
| 2007/0219956 A1 | 9/2007 | Milton |
| 2007/0240127 A1 | 10/2007 | Roques et al. |
| 2007/0288887 A1 | 12/2007 | Pepin et al. |
| 2007/0300057 A1 | 12/2007 | Corcoran et al. |
| 2008/0046462 A1 | 2/2008 | Kaufman et al. |
| 2008/0082569 A1 | 4/2008 | Mansour et al. |
| 2008/0215637 A1 | 9/2008 | Barnes et al. |
| 2008/0222238 A1 | 9/2008 | Ivanov et al. |
| 2008/0256554 A1 | 10/2008 | Yassin |
| 2008/0276224 A1 | 11/2008 | Gyure et al. |
| 2009/0006538 A1 | 1/2009 | Risney, Jr. et al. |
| 2009/0064001 A1 | 3/2009 | Robbins |
| 2009/0077477 A1 | 3/2009 | Khan et al. |
| 2009/0106323 A1 | 4/2009 | Wong et al. |
| 2009/0157811 A1 | 6/2009 | Bailor et al. |
| 2009/0172085 A1 | 7/2009 | Arthursson |
| 2009/0172519 A1 | 7/2009 | Xu et al. |
| 2009/0183072 A1 | 7/2009 | Stephenson et al. |
| 2009/0222749 A1 | 9/2009 | Marinescu et al. |
| 2009/0282096 A1 | 11/2009 | Kamrowski et al. |
| 2009/0292982 A1 | 11/2009 | Choudhary et al. |
| 2010/0017812 A1 | 1/2010 | Nigam |
| 2010/0070230 A1 | 3/2010 | Kumar et al. |
| 2010/0138778 A1 | 6/2010 | Dewan et al. |
| 2010/0161714 A1 | 6/2010 | Dongre |
| 2010/0257230 A1 | 10/2010 | Kroeger et al. |
| 2010/0281475 A1 | 11/2010 | Jain et al. |
| 2010/0293080 A1 | 11/2010 | Shah |
| 2011/0041006 A1 | 2/2011 | Fowler |
| 2011/0107196 A1 | 5/2011 | Foster |
| 2011/0107246 A1 | 5/2011 | Vik |
| 2011/0123973 A1 | 5/2011 | Singh |
| 2011/0125448 A1 | 5/2011 | Jung |
| 2011/0191407 A1 | 8/2011 | Fu et al. |
| 2011/0246922 A1 | 10/2011 | Koenig et al. |
| 2011/0246964 A1 | 10/2011 | Cox, III et al. |
| 2011/0264754 A1 | 10/2011 | Gidugu |
| 2011/0265077 A1 | 10/2011 | Collison et al. |
| 2011/0302516 A1 | 12/2011 | White et al. |
| 2011/0307524 A1 | 12/2011 | Aitken et al. |
| 2011/0314159 A1 | 12/2011 | Murphy et al. |
| 2012/0005192 A1 | 1/2012 | Bao et al. |
| 2012/0023193 A1 | 1/2012 | Eisner et al. |
| 2012/0036125 A1 | 2/2012 | Al-Kofahi et al. |
| 2012/0089610 A1* | 4/2012 | Agrawal ............... G06Q 10/00 |
| | | 707/741 |
| 2012/0090021 A1 | 4/2012 | Luh et al. |
| 2012/0102451 A1 | 4/2012 | Kulkarni et al. |
| 2012/0136926 A1 | 5/2012 | Dillon |
| 2012/0252405 A1 | 10/2012 | Lortz et al. |

(56) References Cited

U.S. PATENT DOCUMENTS

| | | |
|---|---|---|
| 2012/0254405 A1 | 10/2012 | Ganesh et al. |
| 2012/0290940 A1 | 11/2012 | Quine |
| 2012/0317172 A1 | 12/2012 | Redpath |
| 2012/0317233 A1 | 12/2012 | Redpath |
| 2012/0323553 A1 | 12/2012 | Aslam et al. |
| 2013/0019242 A1 | 1/2013 | Chen et al. |
| 2013/0024695 A1 | 1/2013 | Kandrasheu et al. |
| 2013/0031459 A1 | 1/2013 | Khorashadi et al. |
| 2013/0066837 A1 | 3/2013 | Colrain et al. |
| 2013/0097660 A1 | 4/2013 | Das et al. |
| 2013/0117238 A1 | 5/2013 | Gower |
| 2013/0151848 A1 | 6/2013 | Baumann et al. |
| 2013/0159405 A1 | 6/2013 | Nalliah et al. |
| 2013/0166507 A1 | 6/2013 | Staczek |
| 2013/0166693 A1 | 6/2013 | Fernandez et al. |
| 2013/0167162 A1 | 6/2013 | Fernandez |
| 2013/0232336 A1 | 9/2013 | Cheung et al. |
| 2013/0254262 A1 | 9/2013 | Udall |
| 2013/0262626 A1 | 10/2013 | Bozek et al. |
| 2013/0297661 A1 | 11/2013 | Jagota |
| 2013/0301830 A1 | 11/2013 | Bar-El et al. |
| 2013/0311779 A1 | 11/2013 | Sherkin et al. |
| 2014/0007205 A1 | 1/2014 | Oikonomou |
| 2014/0013109 A1 | 1/2014 | Yin |
| 2014/0019419 A1 | 1/2014 | Abraham et al. |
| 2014/0039887 A1 | 2/2014 | Dzik et al. |
| 2014/0040789 A1 | 2/2014 | Munter et al. |
| 2014/0047413 A1 | 2/2014 | Shelve et al. |
| 2014/0053056 A1 | 2/2014 | Weber et al. |
| 2014/0053126 A1 | 2/2014 | Watson et al. |
| 2014/0095874 A1 | 4/2014 | Desai et al. |
| 2014/0108492 A1 | 4/2014 | Garza et al. |
| 2014/0109072 A1 | 4/2014 | Lang et al. |
| 2014/0109078 A1 | 4/2014 | Lang et al. |
| 2014/0173454 A1 | 6/2014 | Sanchez |
| 2014/0258969 A1 | 9/2014 | Brown et al. |
| 2014/0258970 A1 | 9/2014 | Brown et al. |
| 2014/0280009 A1 | 9/2014 | Hage |
| 2014/0280771 A1 | 9/2014 | Bosworth et al. |
| 2014/0281943 A1 | 9/2014 | Prilepov et al. |
| 2014/0282398 A1 | 9/2014 | Podolyak et al. |
| 2014/0282399 A1 | 9/2014 | Gorelik et al. |
| 2014/0298293 A1 | 10/2014 | Nishio et al. |
| 2014/0304507 A1 | 10/2014 | Coppola et al. |
| 2014/0337628 A1 | 11/2014 | Amato |
| 2015/0039732 A1 | 2/2015 | Mall et al. |
| 2015/0040104 A1 | 2/2015 | Mall et al. |
| 2015/0040201 A1 | 2/2015 | Nyisztor et al. |
| 2015/0089340 A1 | 3/2015 | Logan et al. |
| 2015/0089341 A1 | 3/2015 | Davis et al. |
| 2015/0089342 A1 | 3/2015 | Davis et al. |
| 2015/0089351 A1 | 3/2015 | Logan et al. |
| 2015/0128063 A1 | 5/2015 | Jones |
| 2015/0128106 A1 | 5/2015 | Halley et al. |
| 2015/0154415 A1 | 6/2015 | Wu et al. |
| 2015/0163301 A1* | 6/2015 | Narayanan .......... H04L 67/1095 709/205 |
| 2015/0229638 A1 | 8/2015 | Loo |
| 2015/0319252 A1 | 11/2015 | Momohilov et al. |
| 2015/0326640 A1 | 11/2015 | Jellick et al. |
| 2015/0348001 A1 | 12/2015 | Os et al. |
| 2015/0373068 A1 | 12/2015 | Allen et al. |
| 2016/0004668 A1 | 1/2016 | Rowles et al. |
| 2016/0004729 A1 | 1/2016 | Evans |
| 2016/0048848 A1 | 2/2016 | Diggs et al. |
| 2016/0057220 A1 | 2/2016 | Gibbs et al. |
| 2016/0085666 A1 | 3/2016 | Jordan |
| 2016/0085735 A1 | 3/2016 | Davis et al. |
| 2016/0085793 A1 | 3/2016 | Davis et al. |
| 2016/0092176 A1 | 3/2016 | Straub et al. |
| 2016/0092179 A1 | 3/2016 | Straub |
| 2016/0092180 A1 | 3/2016 | Straub |
| 2016/0092339 A1 | 3/2016 | Straub et al. |
| 2016/0092348 A1 | 3/2016 | Straub et al. |
| 2016/0092425 A1 | 3/2016 | Shah et al. |
| 2016/0154629 A1 | 6/2016 | Noens et al. |
| 2016/0203087 A1 | 7/2016 | Nam et al. |
| 2016/0342478 A1 | 11/2016 | Fryc |
| 2016/0342678 A1 | 11/2016 | Newman et al. |
| 2016/0350529 A1 | 12/2016 | Kerr et al. |
| 2016/0378439 A1 | 12/2016 | Straub et al. |
| 2017/0010870 A1 | 1/2017 | Davis et al. |
| 2017/0046134 A1 | 2/2017 | Straub |
| 2017/0046235 A1 | 2/2017 | Straub et al. |
| 2017/0046254 A1 | 2/2017 | Buege |
| 2017/0048215 A1 | 2/2017 | Straub |
| 2017/0048252 A1 | 2/2017 | Straub et al. |
| 2017/0048319 A1 | 2/2017 | Straub |
| 2017/0048339 A1 | 2/2017 | Straub |
| 2017/0063833 A1 | 3/2017 | Colle et al. |
| 2017/0083293 A1 | 3/2017 | Jao et al. |
| 2017/0083503 A1 | 3/2017 | Davis et al. |

OTHER PUBLICATIONS

U.S. Appl. No. 14/333,105, filed Jul. 16, 2014.
Grossman et al., "ToolClips: An Investigation of Contextual Video Assistance for Functionality Understanding, CHI 2010: Looking with Video", Apr. 10-15, 2010, pp. 1515-1524.
Saleh et al., "Pro JSF and HTML5—Building Rich Internet Components", 2nd edition, Apress, 2013, pp. 1.-384.
Boushehrinejadmoradi, "Testing Cross-Platform Mobile App Development Frameworks", IEEE, Jan. 2016, pp. 141-451; http://ieexplore.ieee.org/stamp/stamp.jsp?tp=&amumber=7372032.
Cascaval et al., "ZOOMM: A Parallel Web Browser Engine for Multicore Mobile Devices" ACM, pp. 271-280, 2013.
Cheng, "Virtual Browser for Enabling Multi-device Web Applications", ACM, pp. 1-6, 2012.
Choi et al., "Designing a High-Performance Mobile Cloud Web Browser", ACM, pp. 735-736, 2014.
El-Kassas et al., "Taxonomy of Cross-Platform Mobile Applications Development Approaches", Elsevier, Oct. 2015, pp. 163-190; http://www.sciencedirect.com/science/article/pii/S2090447915001276.
Gaouar et al., Model Driven Approaches to Cross Platform Mobile Development, ACM, IPAC'15, Nov. 2015, pp. 1-5; http://dl.acm.org/citation.cfm?id=2816882&CFID=802186845&CFTOKEN=79626257.
Zucker et al., "Implementing Device UI in Standards-based Markup", ACM 173-176, 2006.
Giray et al., "Systematic Approach for Mapping Software Development Methods to the Essence Framework", ACM, pp. 26-32, 2016.
Hudli et al., "An Evaluation Framework for Selection of Mobile App Development Platform", ACM, pp. 13-16, 2015.
Arvind Tiwari, "Using PFX and PEM Certificate Formats with Keystones", Sep. 27, 2006, ORACLE, pp. 1-3.
Divya Sambasivan et al., "Generic Framework For Mobile Application Development", Dec. 29, 2011, IEEE, pp. 1-5.
El-Kassas et. al., "ICPMD; integrated cross-platform mobile development solution", 9th International Conference on Computer Engineering & Systems (ICCES); 2014, p. 307-17.
Fattoh Al-Qershi et al., "Android vs. iOS: The Security Battle", Oct. 7, 2014, IEEE, pp. 1-8.
Sascha Fahl et al., "Rethinking SSL Development in an Appified World", Nov. 4-8, 2013, ACM, pp. 49-60.
Shankar R. Ponnekanti et al., "ICrafter: A Service Framework for Ubiquitous Computing Environment", UBICOMP 2001, LNCS 2201, Springer-Verlag, 2001, pp. 56-75.
W. Viana et al., "XMobile: A MB-UID environment for semi-automatic generation of adaptive applications for mobile devices", Journal of Systems and Software, vol. 8 No. 1, 2008, pp. 382-394.
Zambon; "Beginning JSP, JSF and Tomcat—Java Web Development"; Apress; Chapters 4-7; 2012.
Czauski et al., "NERD-No Effort Rapid Development Framework for Provisioning Mobile Cloud Applications", 2014, 2nd IEEE International conf mobile cloud computing, services and engineering, 2014, pp. 57-66.

(56) References Cited

OTHER PUBLICATIONS

Jana et al., "Management of Security and Privacy Issues Application Development Mobile Cloud Environment", 2014, International conference on recent advances and innovations in Engineering (ICRAIE-2014), pp. 1-6.
Shiraz et al., "A Review on Distributed Application Processing Frameworks in Smart Mobile Devices for Mobile Cloud Computing", 2013 vol. 15, Issue 3, IEEE Communications Surveys and Tutorials, pp. 1294-1313.
Unknown, "Oracle Database Mobile Server Developer's Guide Release 11.1.0 E22677-03", Sep. 2011, 266 pages.

\* cited by examiner

ADAPTIVE DATA TRANSFER OPTIMIZATION

CROSS REFERENCE TO RELATED APPLICATIONS

This application claims priority of U.S. Provisional Patent Application Ser. No. 62/242,498, filed Oct. 16, 2015, entitled "Adaptive Data Transfer Optimization," the disclosure of which is hereby incorporated by reference.

FIELD

One embodiment is directed generally to application development, and in particular, to developing applications that provide desktop integration.

BACKGROUND INFORMATION

An application refers to a software program, which on execution performs specific desired tasks. In general, several applications are executed in a run-time environment containing one or more of operating systems, virtual machines (e.g., supporting Java™ programming language), device drivers, etc., as is well known in the relevant arts.

Developers often use Application Development Frameworks ("ADFs", which are by themselves applications) for implementing/developing desired applications. An ADF provides a set of pre-defined code/data modules that can be directly/indirectly used in the development of an application. An ADF may also provide tools such as an integrated development environment ("IDE"), code generators, debuggers, etc., which facilitate a developer in coding/implementing the desired logic of the application in a faster/simpler manner.

In general, an ADF simplifies development of applications by providing reusable components and IDEs, which application developers can use to define user interfaces ("UIs") and application logic by, for example, selecting components to perform desired tasks and defining the appearance, behavior, and interactions of the selected components. Some ADFs are based on a model-view-controller design pattern that promotes loose coupling and easier application development and maintenance. Oracle Application Development Framework is one example of an ADF that utilizes this design pattern.

Oracle ADF includes libraries of standards-based Java Server Faces ("JSF") components with built-in HyperText Markup Language 5 ("HTML5") and Asynchronous JavaScript and Extensible Markup Language ("Ajax") functionality. With these components, web deployed UIs can be developed with a level of functionality and interactivity previously reserved for thick-client applications. The components offer data interaction, data visualization, and encapsulated browser side operations in a set of easy to use components that makes rich client application development easier than ever. Oracle ADF further provides a data-binding framework that simplifies binding UI to business services through a simple drag and drop operations in the IDE. This is done while still keeping the independence of the business service from consuming interfaces. With the framework, the UI developer is insulated from the underlying implementation of the business service layer. This makes the process of building the UI truly decoupled from the implementation of the business service layer, better positioning the application for implementation in a service-oriented architecture.

SUMMARY

One embodiment is a system that transfers data for an application. The system determines a per request data size, and sends a data transfer request for transferring a portion of the data from a client to a server according to the per request data size, where the server is configured to host the application. The system then receives a response from the server for the data transfer request, and adjusts the per request data size based on a measure of the data transfer request and the response. The adjusted per request data size is configured to be used for sending other portions of the data from the client to the server.

DETAILED DESCRIPTION

Figure 1:
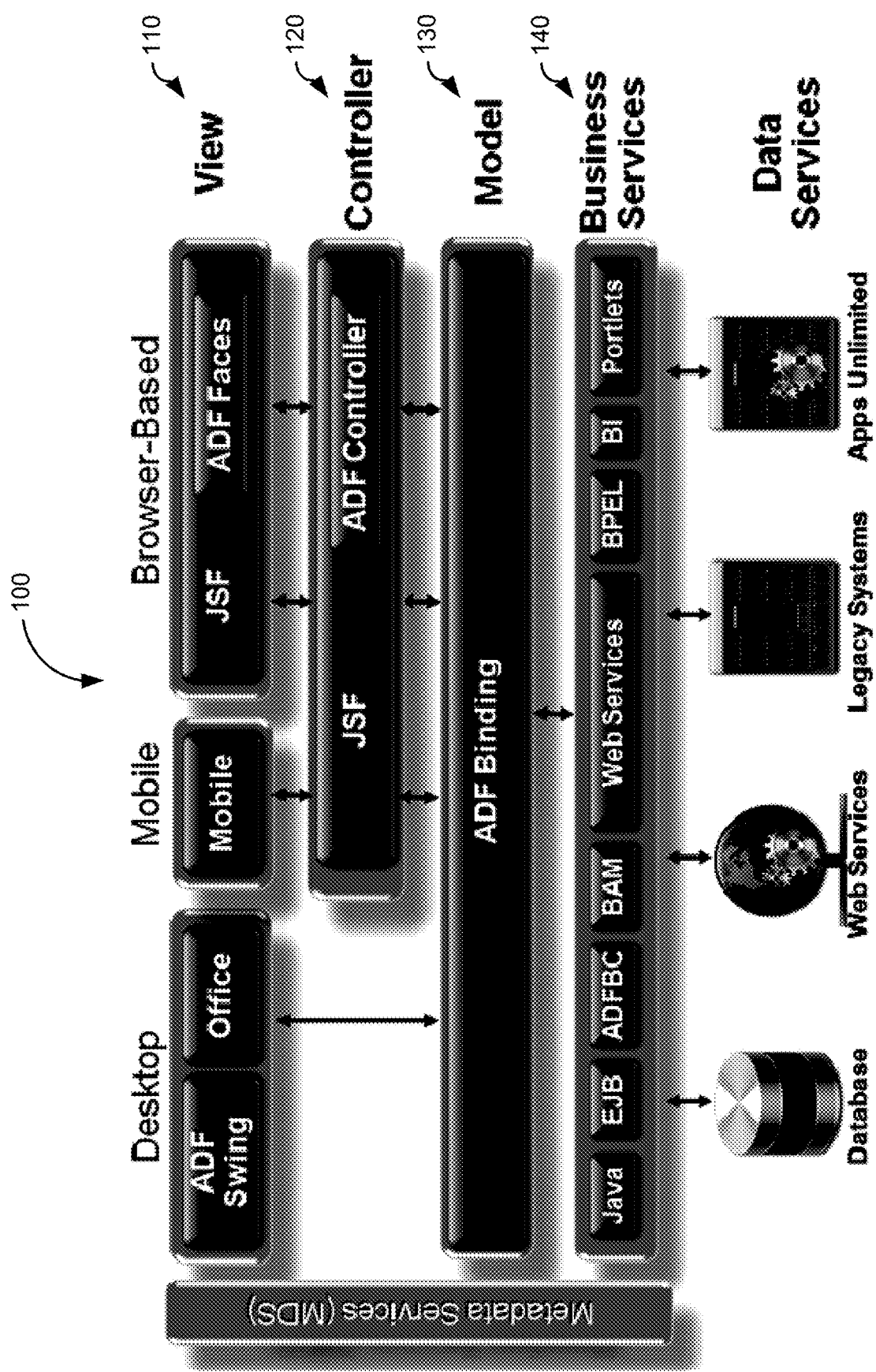
FIG. 1 is a block diagram illustrating an application development framework ("ADF") in one embodiment according to the present invention.

One embodiment provides improved data transfer performance by adaptively adjusting the per request data size in upload and/or download operations. In one embodiment, increasing the amount of data uploaded/downloaded by each request during an upload/download operation reduces the total number of requests needed to upload/download. One embodiment implements multi-sync functionality so that multiple batches of data can be uploaded/downloaded by a single request. Accordingly, by adapting to changes in network/server conditions and/or by implementing multi-sync functionality, embodiments use network/server resources more efficiently.

Generally, Java Platform, Enterprise Edition ("Java EE") is a standard, robust, scalable, and secure platform that forms the basis for many of today's enterprise applications. Java EE provides a set of specifications for building multi-tier applications using the Java language. In the past, there was a direct correlation between the robust nature of an application to the complexity required to achieve it. However, with the advent of Application Development Frameworks ("ADFs"), such as Oracle ADF, the implementation of extremely rich Java EE applications can be provided by adhering to standard patterns and practices with greatly reduced effort.

With the increased need for organizations to build composite applications that utilize Service Oriented Architecture ("SOA") principles, developers are forced to create applications that are extremely agile. Implementing these best practices in agile applications usually involves writing a significant amount of infrastructure code, adding another obstacle for developers building their first Java EE application. In addition to providing robust, performant, and maintainable applications—Oracle ADF provides the infrastructure code to implement agile SOA based applications thereby removing the effort involved in an organization "rolling their own."

Oracle ADF further provides a visual and declarative approach to Java EE development through the Oracle JDeveloper 11g development tool. Oracle ADF implements the Model-View-Controller ("MVC") design pattern and offers an integrated solution that covers all the layers of this architecture with solution to such areas as Object/Relational mapping, data persistence, reusable controller layer, rich web user interface framework, data binding to UI, security, and customization. Extending beyond the core web based MVC approach, ADF also integrates with the Oracle SOA and WebCenter Portal frameworks simplifying the creation of complete composite applications.

For example, Oracle ADF makes it easy to develop agile applications that expose data as services by coupling a service interface to the built-in business services in ADF. This separation of business service implementation details is performed in Oracle ADF via metadata. Use of this metadata-driven architecture enables application developers to focus on the business logic and user experience, rather than the details of how services are accessed.

Oracle ADF stores the implementation details of these services in metadata in the ADF Model layer. This enables developers to exchange services without modifying the UI, making the application extremely agile. Additionally, the developer creating the UI does not need to bother with business service access details. Instead, developers can focus on developing the application interface and interaction logic. Creating the user experience can be as simple as dragging-and-dropping the desired business services onto a visual page designer and indicating what type of component should represent that data.

FIG. 1 is a block diagram illustrating an ADF 100 in one embodiment according to the present invention. FIG. 1 is a simplified illustration of a system that may incorporate various embodiments or implementations of the one or more inventions presented within this disclosure. FIG. 1 may merely be illustrative of an embodiment or implementation of an invention disclosed herein should not limit the scope of any invention as recited in the claims. One of ordinary skill in the art may recognize through this disclosure and the teachings presented herein other variations, modifications, and/or alternatives to those embodiments or implementations illustrated in the figures.

ADF 100 may be embodied as Oracle ADF is one example. Accordingly, ADF 100 is based on an MVC design pattern. An MVC application is separated into: 1) a model layer that handles interaction with data-sources and runs the business logic, 2) a view layer that handles the application UI, and 3) a controller that manages the application flow and acts as the interface between the Model and View layers. Separating applications into these three layers simplifies maintenance and reuse of components across applications. The independence of each layer from the others results in a loosely coupled SOA.

In this embodiment, modules forming an enterprise application are shown as being within ADF 100 to represent that the modules are developed using ADF and then executed within the context of ADF 100. For conciseness, the various internal details of ADF are not shown assuming that the application is developed using the JAVA programming language and Oracle ADF available as part of JDeveloper 10.1.3, a development tool available from Oracle Corp. However, the features of the present invention described below may be implemented using any desired combination of programming language and application development framework as will be apparent to one skilled in the relevant arts by reading the disclosure provided herein.

In various embodiments, ADF 100 allows for an application to be developed in the form of multiple layers, each layer containing code modules/files implementing desired logic according to pre-defined specification. Thus, in one embodiment, ADF 100 enables the application to be developed as four layers: view layer 110 containing code modules/files that provide the UI of the application, controller layer 120 containing code modules that control the flow of the application, model layer 130 containing data/code modules that provide an abstraction layer for the underlying data, and business services layer 140 containing code modules that provide access to data from various sources and handle business logic.

Oracle ADF lets developers choose the technology they prefer to use when implementing each of the layers. FIG. 1 shows various options available for developers when building Oracle ADF applications. The glue that integrates the various components of Java EE applications and makes development so flexible is the Oracle ADF model layer. Enterprise JavaBeans ("EJBs"), Web Services, JavaBeans, JPA/EclipseLink/TopLink objects, and many others can all be used as Business Services for the Oracle ADF Model. View layer 110 can include Web based interfaces implemented with JSF (including ADF Faces), Desktop Swing applications and MS Office front ends, as well as interfaces for mobile devices.

It may be appreciated that the development of the application using such a layered approach often simplifies maintenance and reuse of components/code modules across various applications. Further, the independence of each layer from the other layers results in a loosely coupled SOA, which may be desirable when deploying the developed business/enterprise application on multiple/different systems.

In one aspect, view layer 110 represents the UI of the application being developed. View layer 110 is shown with desktop, mobile, and browser-based views, each of which provides all or a portion of the UI and is accessible in a variety of manners corresponding to view type. For example, web pages may be sent by the application in response to receiving client requests containing corresponding URLs. The web pages may then be displayed by a browser on a display unit (not shown) associated with a requesting client system, thereby enabling users of the requesting client system to interact with the enterprise application. Oracle ADF supports multi-channel access to business services allowing reuse of business services and access from a web client, a client-server swing desktop-based application, Microsoft Excel spreadsheets, mobile devices such as a smart-phone, or the like.

The code files/modules forming the view layer (such as web pages) may be implemented using one or more of hypertext markup language ("HTML"), Java server pages ("JSP"), and Java Server Faces ("JSF"). Alternatively, the UI may be implemented using Java components such as Swing, and/or extensible markup language ("XML"). As further noted, the UI may leverage a user's experience and familiarity with desktop applications, such as Word and Excel by Microsoft.

As noted above, the relevant user-developed code/data modules are provided in each of the layers. However, each layer typically contains other pre-defined code/data modules provided by ADF 100. Some of the pre-defined modules may be used during development, for example, as templates for developing the web pages, for including desired functionality in the developed code etc. Other pre-defined modules (such as a URL rewriting module) may be deployed along with the developed application and may provide additional functionalities (mapping of requested URLs to internal names) to the user during execution of the enterprise application.

Controller layer 120 contains code modules/files that control the flow of the application. Each controller object contains software instructions and/or data implemented according to a desired manner of presenting information in view layer 110. The desired manner may include the specific web pages to be displayed when links in another web page are clicked/selected by the user, the page to be displayed when errors occur during execution, indicating the specific data to be stored/retrieved, etc.

In one aspect, controller layer 120 manages the application flow and handles user input. For example, when a Search button is clicked on a page, the controller determines what action to perform (do a search) and where to navigate to (the results page). There are two controller options for web based applications in JDeveloper: the standard JSF controller or the ADF Controller that extends the JSF controller functionality. Whichever controller is used, application flow is typically designed by laying out pages and navigation rules on a diagram. An application's flow can be broken into smaller, reusable task flows; include non-visual components such as method calls and decision points in a flow; and create "page fragment" flows that run inside a region of a single containing page.

The code modules/files forming controller layer 120 are often implemented as Java servlets receiving the client requests and sending desired web pages as corresponding responses. Controller objects may also be implemented, for example, as Apache Jakarta Struts controllers or according to the JSF standard.

Model layer 130 contains data/code modules that connect various business services to the objects that use them in the other layers, such as to the controller objects discussed above or directly to desktop applications as shown. Each abstract data object of model layer 130 provides a corresponding interface that can be used to access any type of business service, executing in underlying business service layer 140. The data objects may abstract the business service implementation details of a service from a client and/or expose data control methods/attributes to view components, providing a separation of the view and data layers.

In one aspect, model layer 130 includes two components: data controls and data bindings, which utilize metadata files to define the interface. Data controls abstract the business service implementation details from clients. Data bindings expose data control methods and attributes to UI components, providing a clean separation of the view and model layers. Due to the metadata architecture of the model layer, developers get the same development experience when binding any type of Business Service layer implementation to the View and Controller layers.

Oracle ADF emphasizes the use of the declarative programming paradigm throughout the development process to allow users to focus on the logic of application creation without having to get into implementation details. At a high level, the development process for a Fusion web application usually involves creating an application workspace. Using a wizard, libraries and configuration needed for technologies selected by a developer are automatically added and an application is structured into projects with packages and directories.

By modeling database objects, an online database or offline replica of any database can be created, definitions edited, and schemas updated. Using a UML modeler, use cases can then be created for the application. Application control and navigation can also be designed. Diagrammers can be used to visually determine the flow of application control and navigation. Then, an underlying XML file describing the flow can be automatically created. A resource library can be used to allow a developer to view and use imported libraries by simply dragging and dropping them into the application. From database tables, entity objects can be created using wizards or dialogs. From those entity objects, view objects are created to be used by pages in the application. Validation rules and other types of business logic can be implemented.

In this example, business services layer 140 manages interaction with a data persistence layer. It provides such services as data persistence, object/relational mapping, transaction management, and business logic execution. The Business Services layer in Oracle ADF can be implemented in any of the following options: as simple Java classes, EJB, Oracle ADF Business Components ("ADFBC"), JPA objects, Oracle Business Activity Monitoring ("BAM"), web services, Oracle Business Process Execution Language ("BPEL"), Oracle Business Intelligence ("BI"), and portlets. In addition, data can be consumed directly from files (XML or CSV) as well as REST.

Thus, each business service manages interaction with a corresponding data persistence layer, and also provides such services as object/relational mapping, transaction management, business logic execution, etc. The business services layer may be implemented using one or more of simple Java classes, Enterprise Java Beans, web services, etc.

Business components represent a business service implemented using, for example, Oracle ADF Business Components, to provide interaction with databases, web services, legacy systems, application servers, and the like. In one embodiment, business components of business services layer 140 contain a mixture of application modules, view/query objects, and entity objects, which cooperate to provide the business service implementation. An application module can be a transactional component/code module that UI clients communicate with for working with application/transaction data. The application module may provide an updatable data model and also procedures/functions (commonly referred to as service methods) related to user transactions.

An entity object may represent a corresponding row in a database table and simplifies the manipulation (update, deletion, etc.) of the data stored in the corresponding row. An entity object often encapsulates business logic for the corresponding row to ensure that the desired business rules are consistently enforced. An entity object may also be associated with other entity objects to reflect relationships existing between rows stored in the underlying database.

Desktop Integration

ADF Desktop Integration ("ADFdi") extends the Oracle ADF into the world of desktop applications like Microsoft Excel. Application developers can rapidly develop integrated documents, such as spreadsheets and documents of other desktop-based applications, to allow users to access and edit critical business data. This framework integrates seamlessly with each web application's security and business logic infrastructure. It also allows end users to edit their data without a live connection to the network. Once reconnected, ADFdi can transparently upload and validate all user changes against the application's backend. Thus, ADFdi allows developers to extend functionality provided by web based applications to desktop applications. End users may also prefer ADFdi because it provides a familiar UI in the user's preferred desktop application to undertake information management tasks, such as performing complex calculations or uploading a large amount of data, easily and seamlessly.

Figure 2:
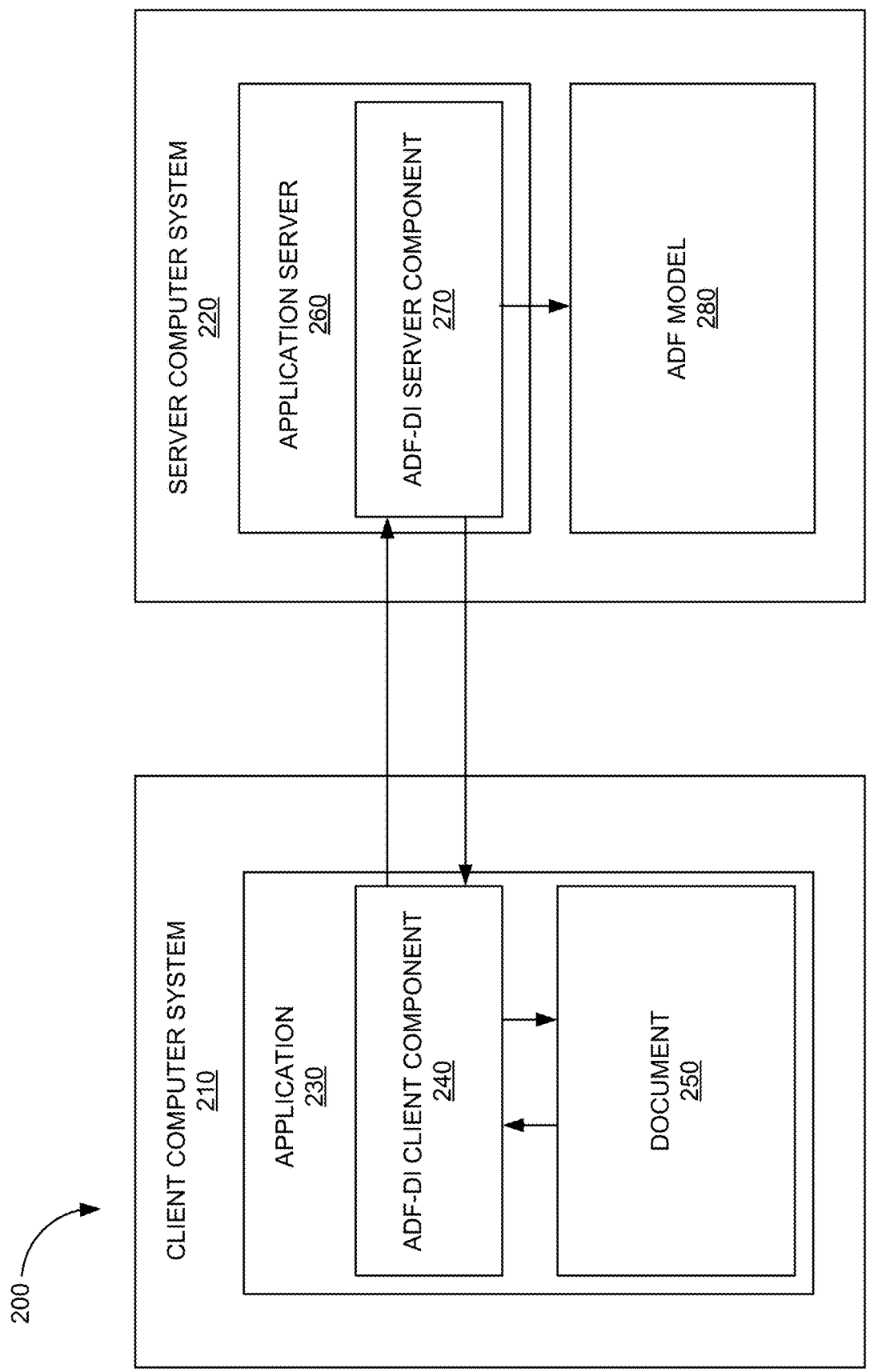
FIG. 2 is a block diagram illustrating a desktop integration framework for ADF of FIG. 1 in one embodiment according to the present invention.

FIG. 2 is a block diagram illustrating desktop integration framework 200 for ADF 100 of FIG. 1 in one embodiment according to the present invention. Desktop integration framework 200 may incorporate various embodiments or implementations of the one or more inventions presented within this disclosure. Desktop integration framework 200 is merely illustrative of an embodiment or implementation of an invention disclosed herein and should not limit the scope of any invention as recited in the claims. One of ordinary skill in the art may recognize through this disclosure and the teachings presented herein other variations, modifications, and/or alternatives to those embodiments or implementations illustrated in the figures.

In this example, desktop integration framework 200 includes client computer system 210 and server computer system 220. Client computer system 210 is representative of hardware and/or software elements configured to provide access to and/or host application 230. Client computer system 210 may be embodied as a personal computer system, a laptop, a tablet, a mobile device, and the like. Client computer system 210 may include one or more operating systems, applications, browsers, and the like executing on one or more computers. Client computer system 210 is merely illustrative of an embodiment or implementation of an invention disclosed herein should not limit the scope of any invention as recited in the claims. One of ordinary skill in the art may recognize through this disclosure and the teachings presented herein other variations, modifications, and/or alternatives to those embodiments or implementations illustrated in the figures.

Application 230 is representative of one or more software elements that allow users to generate, edit, or otherwise interact with documents. Some examples of application 230 are text editors, word processing applications, spreadsheet applications, image editing and manipulation programs, and the like. In various embodiments, desktop integration framework 200 operates with configurations specific to desktop applications, such as Microsoft Office products like Microsoft Word and Microsoft Excel.

Application 230 further includes or is otherwise in communication with ADF-DI client component 240 and creates document 250. ADF-DI client component 240 is representative of one or more software elements that extend the functionality provided by web based or other network accessible applications to application 230. For example, ADF-DI client component 240 allows end users to avail themselves of a familiar UI associated with application 230 to undertake information management tasks using document 250 that are normally performed by accessing server computer system 220. These tasks may be performed by or handled by web based or other network accessible applications hosted by server computer system 220. In various embodiments, data manipulated by such information management tasks performed in application 230 is synchronized with server computer system 220.

Document 250 is representative of one or more computer data files or units of electronic information. Document 250 may include text, images, audio, video, and other multimedia information. Document 250 may further be associated with metadata specific to application 230. Document 250 (or application 230) may provide native functionality for creating, interacting, and managing content associated with document 250. In various aspects, application 230 provides one or more interfaces for interacting with functionality of application 230 or content of document 250.

Server computer system 220 is representative of hardware and/or software elements configured to provide access to and/or host application server 260. Server computer system 220 may be embodied as local server computer system, a cloud service, and the like. Server computer system 220 may include one or more operating systems, servers, services, applications, and the like executing on one or more computers. Server computer system 220 is merely illustrative of an embodiment or implementation of an invention disclosed herein should not limit the scope of any invention as recited in the claims. One of ordinary skill in the art may recognize through this disclosure and the teachings presented herein other variations, modifications, and/or alternatives to those embodiments or implementations illustrated in the figures.

Application server 260 is representative of one or more software elements that allow users to interact with web based or network based applications. Some examples of application server 260 are either a software framework that provides a generalized approach to creating an application-server implementation, without regard to what the application functions are, or the server portion of a specific implementation instance. In various embodiments, application server 260 operates with configurations specific to Java EE that defines a core set of API and features of Java Application Servers. Application server 260 may include servlets, and JavaServer Pages, Enterprise JavaBeans, and the like. Application server 260 is merely illustrative of an embodiment or implementation of an invention disclosed herein should not limit the scope of any invention as recited in the claims. One of ordinary skill in the art may recognize through this disclosure and the teachings presented herein other variations, modifications, and/or alternatives to those embodiments or implementations illustrated in the figures.

ADF-DI server component 270 is representative of one or more server components, such as part of application server 260. In general, ADF-DI client component 240 acts as both view layer 110 and controller layer 120 and communicates with ADF-DI server component 270 acting in part as model layer 130 to synchronize data and execute business logic in applications hosted by application server 260 or in communication with application server 260 using ADF model 280. As discussed above, model layer 130 represents the data values related to a current view presented by ADF-DI client component 240 within application 230, along with model-level business rules, security, and application logic used against the data values. In this example, ADF-DI client component 240 and ADF-DI server component 270 allow end users to avail themselves of a familiar UI associated with application 230 to undertake View/Controller tasks using document 250 to access ADF model 280.

In one aspect, a developer utilizes a design mode of ADF-DI client component 240 to work within application 230 to create document 250. The developer can structure and format document 250 in a desired manner utilizing native tools of application 230. The developer can also add components to document 250 using ADF-DI client component 240 to integrate document 250 with application server 260. Some examples of components or (ADFdi components) are input components (e.g., form components), output components, labels, lists, buttons, images, tables, and the like.

In various embodiments, the developer maps components that are added to document 250 to corresponding data or models associated with application server 260. The data or models can be provided by or through ADF-DI server component 270. In various embodiments, each component added to document 250 is mapped to data or an attribute of a data model exposed by model layer 130 to provide an input/output mechanism within document 250. In this example, a text box component can be added to document 250 and mapped to an attribute of ADF model 280 provided by or exposed through ADF-DI server component 270 to ADF-DI client component 240.

In one aspect, a component is a reusable entity, one having functionality that can be used by many applications or that can be used multiple times by the same application. Components can be embedded within document 250. A component generally provides one or more interfaces, such as a programming interface, a data-binding interface, or a visual interface. In one embodiment, a component having no visual representations added to document 250 is rendered or but not otherwise displayed at runtime and can provide some additional functionality. A component may have zero or more visual representations. As described further below, a component can have a visual representation driven by an underlying model.

In one aspect, a component can specify any number of views at design time, any of which can be displayed at runtime. A view assembly is the set of views that are actually displayed at runtime. The view assembly, for an application or a component, consists of views in the view composition that is selected for display at a certain point in time.

Once all desired components are included and mapped to data and/or model metadata accessible to application server 260 and ADF model 280, document 250 can be "published" or otherwise made available on application server 260. Application server 260 may provide a download link to published documents enabling users to access the documents via a browser and begin working within application 230 to view, create, and/or manipulate data, such as that stored in a database accessible to server computer system 220. In various embodiments, published documents are stored separately from the document metadata that defines components, data mappings, and any logic a developer associated with a document. In some embodiments, a published document includes all document metadata.

Figure 3:
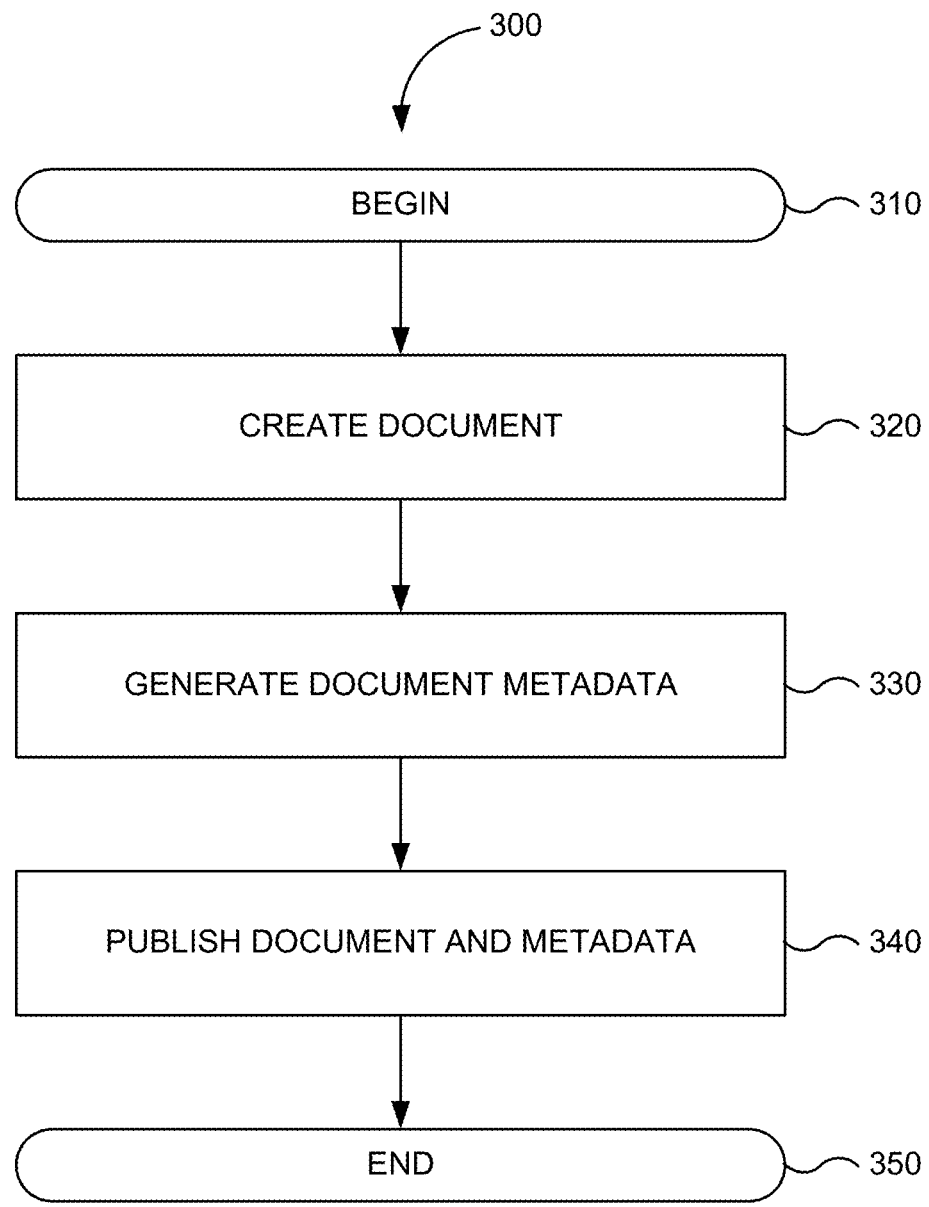
FIG. 3 is a flowchart of a method for designing a document using the desktop integration framework of FIG. 2 in one embodiment according to the present invention.

FIG. 3 is a flowchart of method 300 for designing a document using desktop integration framework 200 of FIG. 2 in one embodiment according to the present invention. Implementations or processing in method 300 depicted in FIG. 3 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 300 depicted in FIG. 3 begins in step 310.

In step 320, a document is created. In various embodiments, documents are created by a user or developer by using an application that natively creates such documents or by using a software library that creates documents in their native format. According to FIG. 2, a user can open an existing document or create a new document in application 230. For example, the user may create a new spreadsheet in Microsoft Excel and populate the spreadsheet with various workbooks, sheets, tables, graphs, or the like. The user may edit, structure, or format the document in any desired manner using native and non-native tools.

In step 330, document metadata is generated. The document metadata includes information utilized by an integration component of an application (e.g., ADF-DI client component 240) to render contents of an associated document. In one aspect, the document metadata identifies each component included in the document. In another aspect, the document metadata identifies how a component is bound to specific data or to attribute metadata of one or more models. The document metadata can further provide access information, static data, other logic or data manipulation information, or references to where such may be obtained.

As discussed above with respect to FIG. 2, a developer can add components to document 250 using ADF-DI client component 240 to integrate document 250 with application server 260. In various embodiments, ADF-DI client component 240 provides an expression builder allowing a developer to specify values for one or more properties of documents or components that may be added to the documents. In one aspect, a property defines an aspect of the behavior of its corresponding component. For example, a property may specify a model or object that is mapped to the component and/or one or more attributes of the model or object corresponding to the component. In another aspect, a property may specify aspects of a document such as table column headers, worksheet ribbon commands, native document functionality, and the like.

In step 340, the document and the document metadata are published. As discussed above, published documents can be stored separately from the document metadata. In various embodiments, the document is uploaded to a web-based application and made available to users of the application. The document metadata can be uploaded to a metadata repository associated with the application. In some embodiments, a published document may include all or part of the document metadata.

In the example of FIG. 2, a published document includes at least enough metadata that enables ADF-DI client component 240 to initialize the document and request additional information from ADF-DI server component 270 to render the contents of document 250 for the user at runtime. FIG. 3 ends in step 350.

During runtime, a user downloads published document 250 and opens it with application 230. In one embodiment, ADF-DI client component 240 has been installed as an application plugin or module. ADF-DI client component 240 can then detect that document 250 has been authored to include framework components. ADF-DI client component 240 contacts ADF-DI server component 270 to request document metadata, actual data, and any logic that needs to be performed to render document 250. For example, ADF-DI client component 240 may first retrieve from or through from ADF-DI server component 270 document metadata defining which components are to be included and where to include them. ADF-DI client component 240 may retrieve from or through from ADF-DI server component 270 data from ADF model 280 for which selected components will use or otherwise operate on. ADF-DI client component 240 may further retrieve from or through from ADF-DI server component 270 any logic associated with document 250. Finally, ADF-DI client component 240 may then render contents of document 250 utilizing the document metadata, actual data, and logic.

Accordingly, a user may retrieve a document template and have the document content automatically updated and formatted based on processing performed by ADF-DI client component 240 and data obtained from application server 260. The users can then avail themselves of the familiar UI associated with application 230 to undertake tasks using document 250.

In various aspects, as the user interacts with or manipulates document 250, ADF-DI client component 240 and ADF-DI server component 270 may remain in communication to send and receive updates accordingly. Changes made within one or more components of document 250 to data of a corresponding model in model layer 130 may be persisted in ADF model 280.

Figure 4:
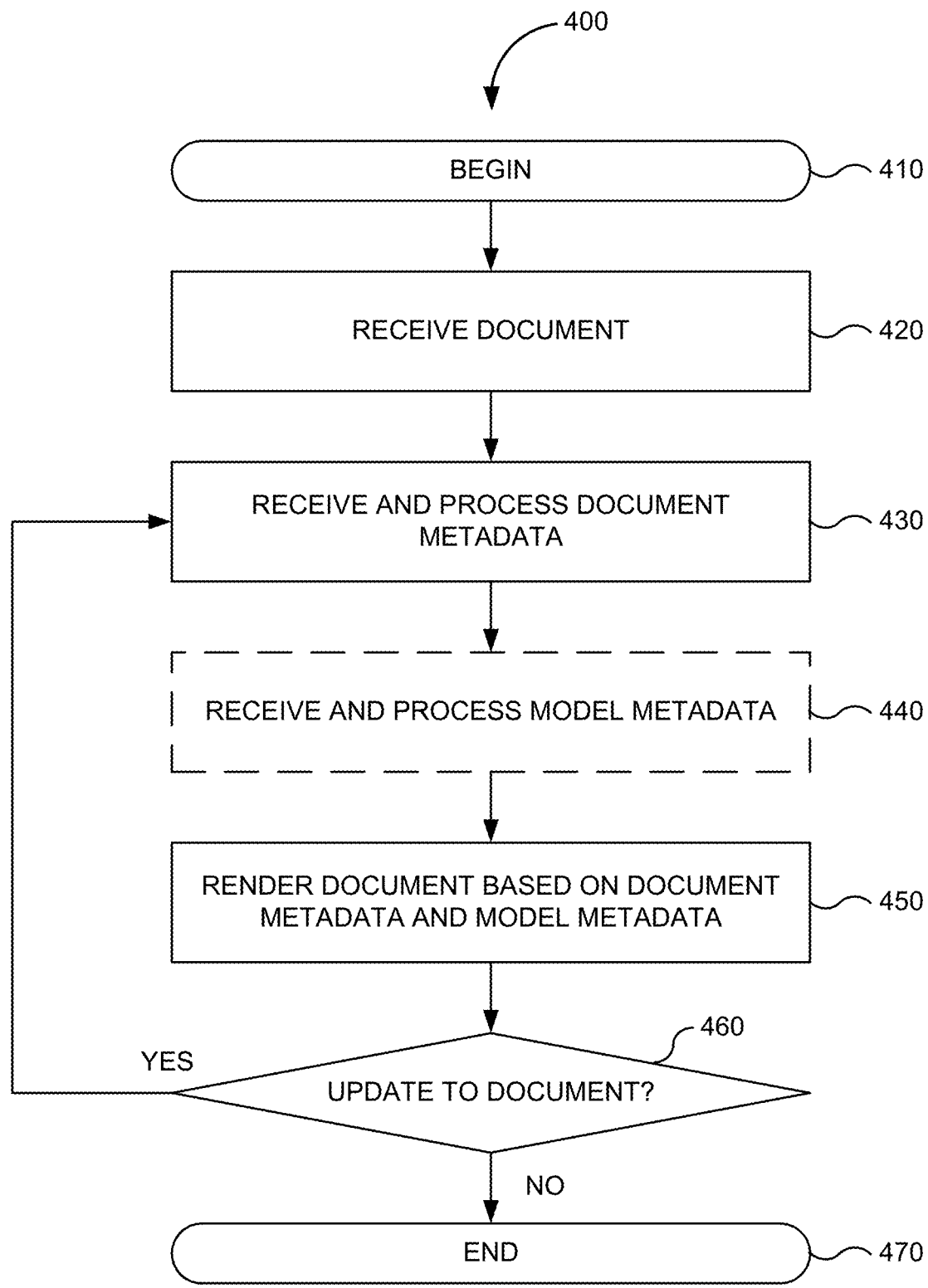
FIG. 4 is a flowchart of a method for interacting with a document using the desktop integration framework of FIG. 2 in one embodiment according to the present invention.

FIG. 4 is a flowchart of method 400 for interacting with a document using desktop integration framework 200 of FIG. 2 in one embodiment according to the present invention. Implementations or processing in method 400 depicted in FIG. 4 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 400 depicted in FIG. 4 begins in step 410.

In step 420, a document is received. As discussed above, documents are published enabling users to access the documents via a browser and begin working within an application (e.g., application 230). In various embodiments, a user selects a document from a web based application to use as an interface to data provided by the web based application. The user downloads the document to the user's computer and opens the document using its native application. A plugin of the native application or other software of the client device (e.g., ADF-DI client component 240) detects that the document is an integrated document and begins the rendering process. According to FIG. 2, a user can interact with application server 260 to retrieve a desired document, such as by clicking a document link. The document may be downloaded or otherwise communicated to client computer system 210 and opened in application 230.

In step 430, document metadata is received and processed. In various embodiments, the document metadata is received separately from the document being rendered. For example, an integration component of the native application can detect that a document being opened is an integrated document and begin the rendering process by requesting appropriate document metadata. In some embodiments, all or part of the document metadata is integrated into the document being rendered. The document metadata includes information utilized by the integration component to render contents of the document. Accordingly, based on the document metadata, ADF-DI client component 240 can determine which components are to be added to document 250 and where. ADF-DI client component 240 further determines what data or model is used by each component as well as applies any logic defined by a developer.

In optional step 440, model metadata is received and processed. In various embodiments, the model metadata is received separately from the document being rendered and the document metadata. For example, an integration component of the native application can detect during the rendering process that one or more components have properties that are driven by attributes of one or more models. In one aspect, the model metadata identifies how a component is bound to metadata of various models. Accordingly, based on the model metadata, ADF-DI client component 240 can update or augment the document metadata associated with document 250. ADF-DI client component 240 further determines what data is referenced by or otherwise used by the metadata of the various associated models.

In step 450, the document is rendered based on the document metadata and the optional model metadata. As discussed above, ADF-DI client component 240 may retrieve from or through from ADF-DI server component 270 data from ADF model 280 for which selected components will use or otherwise operate on. ADF-DI client component 240 may further retrieve from or through from ADF-DI server component 270 any logic associated with document 250. Finally, ADF-DI client component 240 may then render contents of document 250 utilizing the document metadata, actual data, and logic.

In step 460, a determination is made whether an update to the document exists. There may be a variety of reasons why an update to the document may exist. As a user interacts with or manipulates document 250, ADF-DI client component 240 and ADF-DI server component 270 may remain in communication to send and receive updates accordingly. Changes made within one or more components of document 250 to data of a corresponding model in model layer 130 may be persisted in ADF model 280. In some embodiments, an interaction by a user may require a new dataset. As such, the flow of method 400 returns to step 430 to process any additional document data and optional model metadata. The document can then be rendered (or a portion re-rendered) in step 450. FIG. 4 ends in step 470.

Model-Driven Aspect

In various embodiments, desktop integration framework 200 allows a developer to include components in document 250 whose view and data are driven by corresponding models or model attributes. In one aspect, components may be rendered or have their behavior defined dynamically at runtime based on data or logic of corresponding models or model attributes. Data defined via a model or object can automatically configure components of the document when rendered. For example, elements of a list component may be populated with preexisting values associated with one or more attributes of a model or object. Accordingly, a developer is not required to specify the values in each view that a component presents when the document is rendered.

Figure 5:
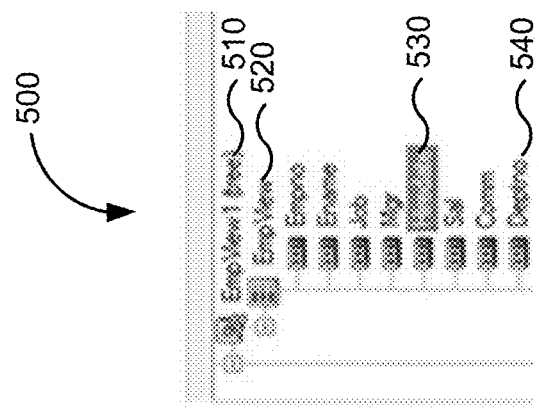
FIG. 5 is an illustration of a screenshot of document components whose views may be driven by underlying data models in one embodiment according to the present invention.

FIG. 5 is an illustration of screenshot 500 of document components whose views may be driven by underlying data models in one embodiment according to the present invention. In this example, tree 510 provides a listing of one or more views that may be presented in document 250. In the example, EmpView 520 includes one or more components, such as text, list, image, date, and the like labeled "Empno", "Ename", "Job", "Mgr", etc.

In one aspect, an underlying data model or attribute of an employee object associated with component 530 is labeled "Hiredate." The data model or attribute is configured to store a date value associated with the date that a given employee was hired by an organization. In various embodiments, the view or behavior of component 530 may be driven by the fact that the attribute stores a date value absent further configuration by a developer. For example, at the time that ADF-DI client component 240 renders an Excel workbook having a cell corresponding to component 530 that stores a value representing the date of the employees hire, the cell is automatically formatted for date information. ADF-DI client component 240 can also configure the cell such that when a user selects the cell, a date popup is provided within or outside of the native features of Excel allowing the user to select a new date of hire or modify an existing date of hire.

In another aspect, an underlying data model or attribute of an employee object associated with component 540 is labeled "Deptno." The data model or attribute is configured to store an identifier for a department or team associated with an employee. In various embodiments, the view or behavior of component 540 may be driven by the fact that the attribute stores one of a plurality of predetermined values specified in the data model absent further configuration by a developer. For example, at the time that ADF-DI client component 240 renders an Excel workbook having a cell corresponding to component 540, ADF-DI client component 240 may configure the cell such that when a user selects the cell that stores a value representing the department or team to which the employee is assigned, a drop down list is provided within or outside of the native features of Excel allowing the user to select from a predetermined list of departments or teams derived from the data model.

Figure 6:
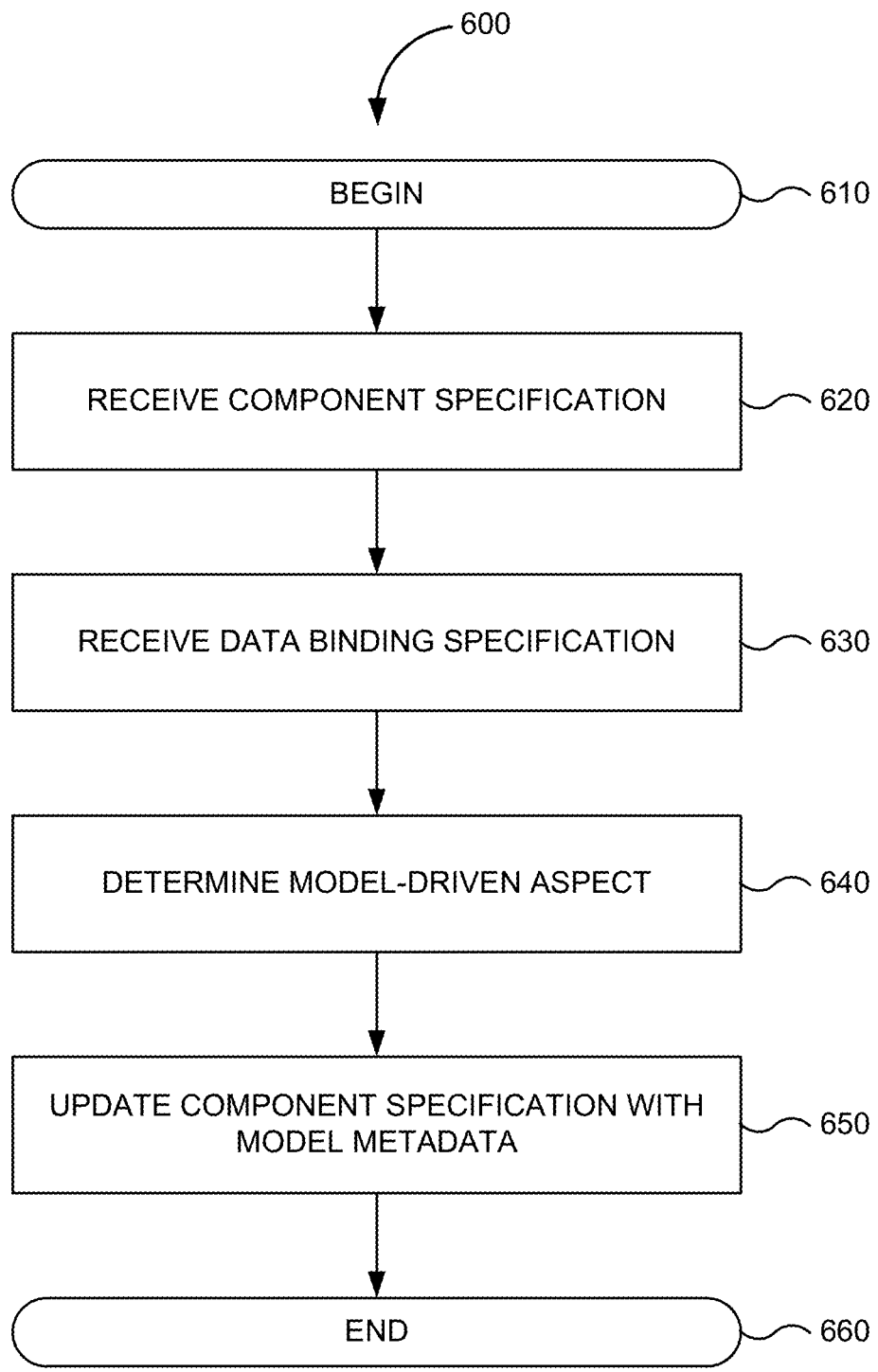
FIG. 6 is a flowchart of a method for designing a model-driven aspect of a component using the desktop integration framework of FIG. 2 in one embodiment according to the present invention.

FIG. 6 is a flowchart of method 600 for designing a model-driven aspect of a component using desktop integration framework 200 of FIG. 2 in one embodiment according to the present invention. Implementations or processing in method 600 depicted in FIG. 6 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 600 depicted in FIG. 6 begins in step 610.

In step 620, a component specification is received. In general, a component specification refers to information that specifies how the component is defined. According to FIG. 2, a developer can open an existing document or create a new document in application 230, such as creating a new spreadsheet in Microsoft Excel. The developer then may edit, structure, or format the document in any desired manner using native and non-native tools. Additionally, the developer may select from a plurality of predetermined components and add those components to document 250.

In step 630, a data binding specification is received. In general, a data binding specification refers to information that specifies how the component interacts with data, such as its source and the like. In various embodiments, ADF-DI client component 240 utilizes this information to further configure the component in addition to the component specification. In one aspect, ADF-DI client component 240 identifies how each component will present one or more views based on one or more models or objects associated with the component. ADF-DI client component 240 may interact with ADF-DI Server component 270 to retrieve model aspects, values, and the like to configure the component, any associated views, as well as associated behaviors. In various embodiments, ADF-DI client component 240 may receive a component specification and data binding specification in response to a user using the expression builder discussed above.

In step 640, a model-driven aspect of the component is determined. ADF-DI client component 240 may interact with ADF-DI Server component 270 to retrieve model aspects, values, and the like known as attribute properties or hints in ADF model 280 to configure the component, any associated views, as well as associated behaviors. The configuration information may be stored in the document metadata that may be associated with a published document.

In one example, a label that is presented to a user is often different from the name of a data object corresponding to the label. For example, an attribute called "EmpName" may exist, but in the UI, a developer may desire to display "Employee Name." Most UI frameworks allow the developer to specify a user-friendly label. However, it is not efficient to specify the user-friendly label in each place it needs to appear. The "model-driven" approach is to associate the user-friendly label with the EmpName attribute at the model level. Then, each UI element (page, worksheet, etc.) that wants to render EmpName will "refer" to EmpName's label indirectly at design-time and fetch it dynamically at runtime. The approach applies to various different potential properties of a data object. Other examples include "read-only", "mandatory," etc. FIG. 6 ends in step 650.

In some embodiments, a model-driven aspect of a component is determined at runtime rather than at design time. ADF-DI client component 240 may interact with ADF-DI server component 270 to retrieve model aspects, values, and the like known as attribute properties or hints in ADF model 280 to update or augment configuration information for a component associated with the document being rendered.

Systems depicted in some of the figures may be provided in various configurations. In some embodiments, the systems may be configured as a distributed system where one or more components of the system are distributed across one or more networks in a cloud computing system.

Figure 7:
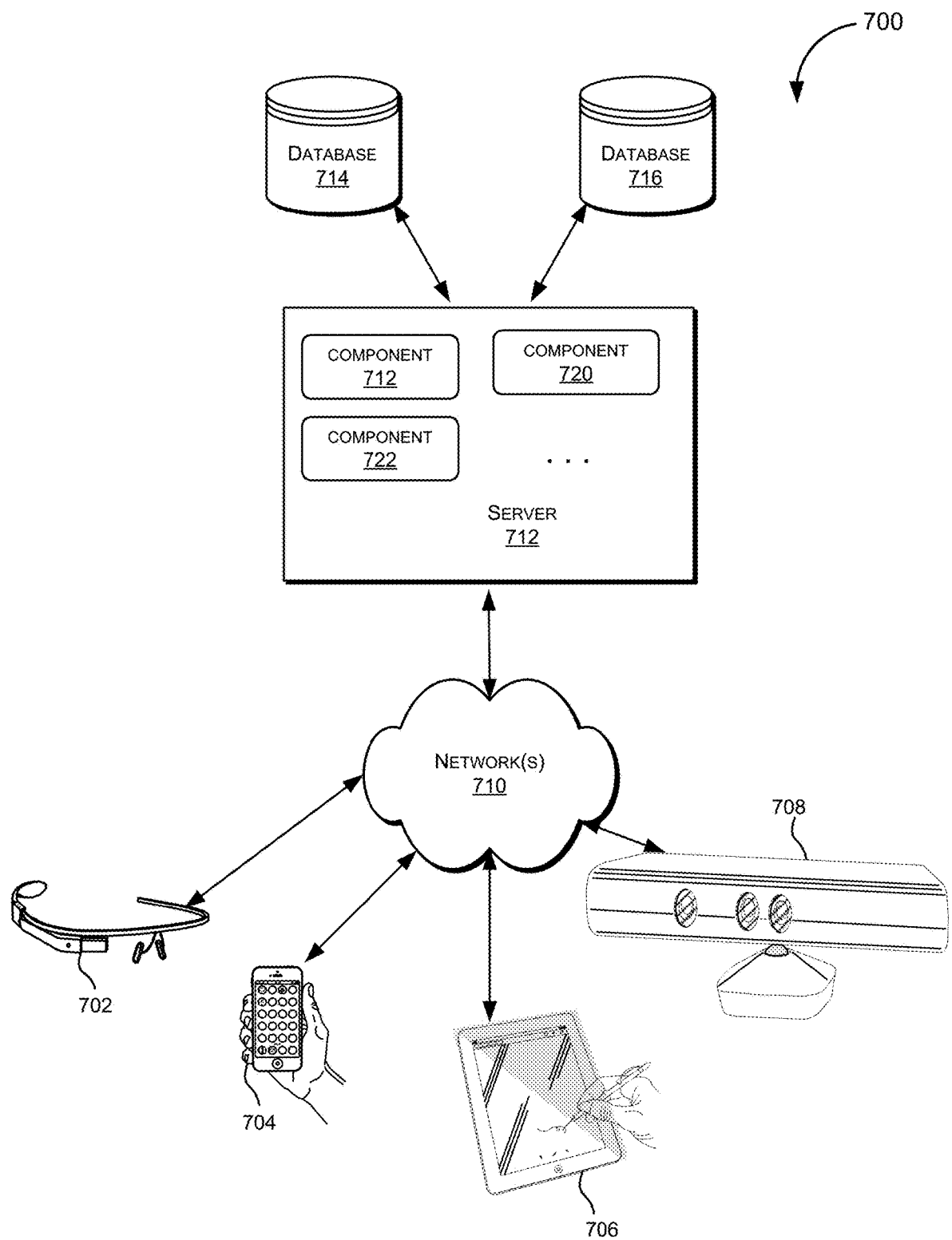
FIG. 7 depicts a simplified diagram of a distributed system for implementing one of the embodiments.

FIG. 7 depicts a simplified diagram of a distributed system 700 for implementing one of the embodiments. In the illustrated embodiment, distributed system 700 includes one or more client computing devices 702, 704, 706, and 708, which are configured to execute and operate a client application such as a web browser, proprietary client (e.g., Oracle Forms), or the like over one or more network(s) 710. Server 712 may be communicatively coupled with remote client computing devices 702, 704, 706, and 708 via network 710.

In various embodiments, server 712 may be adapted to run one or more services or software applications provided by one or more of the components of the system. In some embodiments, these services may be offered as web-based or cloud services or under a Software as a Service ("SaaS") model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in the figure, the software components 718, 720 and 722 of system 700 are shown as being implemented on server 712. In other embodiments, one or more of the components of system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The embodiment shown in the figure is thus one example of a distributed system for implementing an embodiment system and is not intended to be limiting.

Client computing devices 702, 704, 706, and/or 708 may be portable handheld devices (e.g., an iPhone®, cellular telephone, an iPad®, computing tablet, a personal digital assistant ("PDA")) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service ("SMS"), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 702, 704, 706, and 708 may be any other electronic device, such as a thin-client computer, an Internet-enabled gaming system (e.g., a Microsoft Xbox gaming console with or without a Kinect® gesture input device), and/or a personal messaging device, capable of communicating over network(s) 710.

Although distributed system 700 is shown with four client computing devices, any number of client computing devices may be supported. Other devices, such as devices with sensors, etc., may interact with server 712.

Network(s) 710 in distributed system 700 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 710 can be a local area network ("LAN"), such as one based on Ethernet, Token-Ring and/or the like. Network(s) 710 can be a wide-area network and the Internet. It can include a virtual network, including without limitation a virtual private network ("VPN"), an intranet, an extranet, a public switched telephone network ("PSTN"), an infra-red network, a wireless network (e.g., a network operating under any of the Institute of Electrical and Electronics ("IEEE") 802.11 suite of protocols, Bluetooth®, and/or any other wireless protocol); and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 712 may be adapted to run one or more services or software applications described in the foregoing disclosure. For example, server 712 may correspond to a server for performing processing described above according to an embodiment of the present disclosure.

Server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Database servers include without limitation those commercially available from Oracle, Microsoft, Sybase, IBM (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more databases 714 and 716. Databases 714 and 716 may reside in a variety of locations. By way of example, one or more of databases 714 and 716 may reside on a non-transitory storage medium local to (and/or resident in) server 712. Alternatively, databases 714 and 716 may be remote from server 712 and in communication with server 712 via a network-based or dedicated connection. In one set of embodiments, databases 714 and 716 may reside in a storage-area network ("SAN"). Similarly, any necessary files for performing the functions attributed to server 712 may be stored locally on server 712 and/or remotely, as appropriate. In one set of embodiments, databases 714 and 716 may include relational databases, such as databases provided by Oracle, that are adapted to store, update, and retrieve data in response to SQL-formatted commands.

Figure 8:
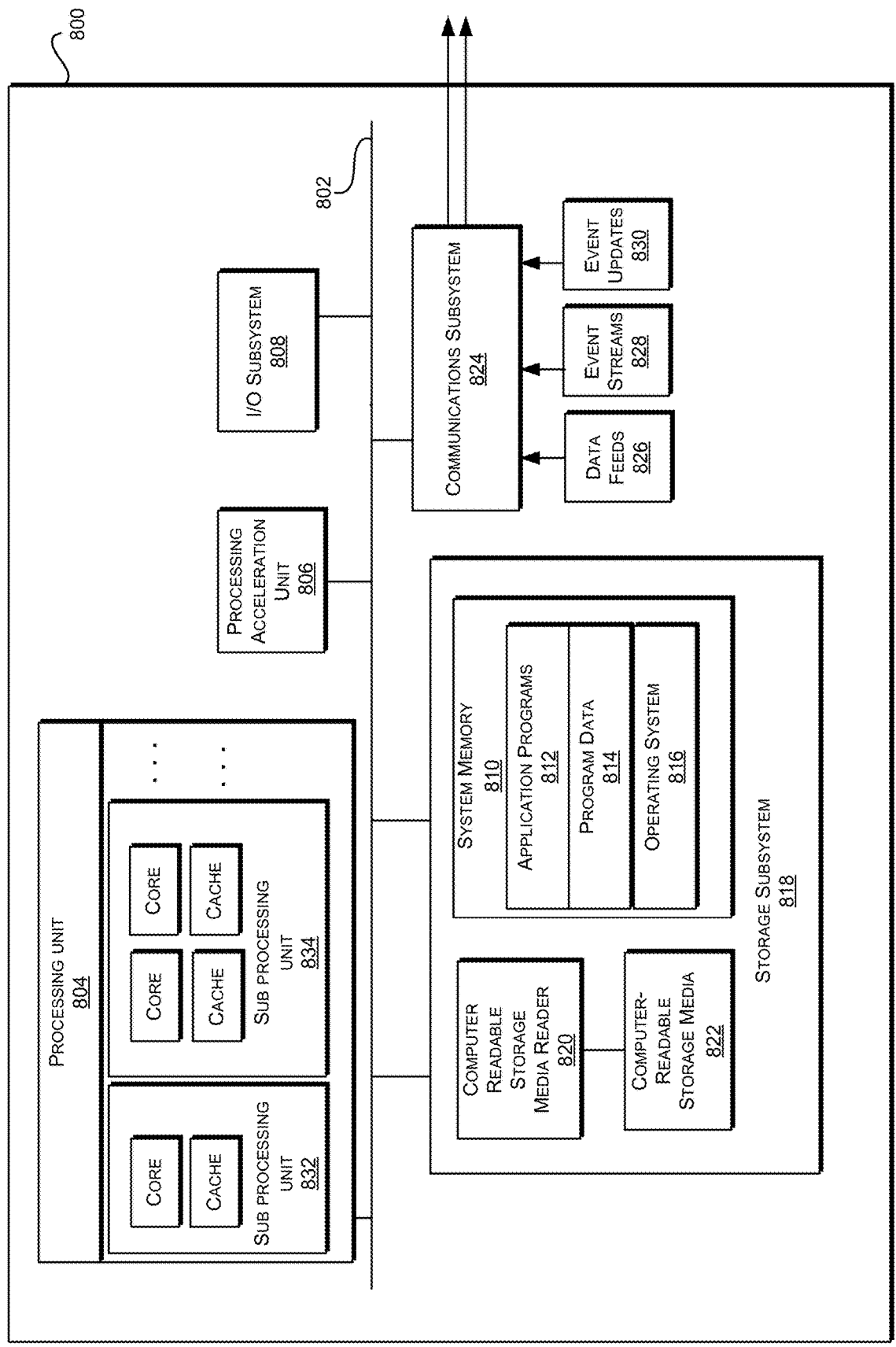
FIG. 8 illustrates a computer system, in which various embodiments of the present invention may be implemented.

FIG. 8 illustrates a computer system 800, in which various embodiments of the present invention may be implemented. The system 800 may be used to implement any of the computer systems described above. As shown in the figure, computer system 800 includes a processing unit 804 that communicates with a number of peripheral subsystems via a bus subsystem 802. These peripheral subsystems may include a processing acceleration unit 806, an I/O subsystem 808, a storage subsystem 818, and a communications subsystem 824. Storage subsystem 818 includes tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture ("ISA") bus, Micro Channel Architecture ("MCA") bus, Enhanced ISA ("EISA") bus, Video Electronics Standards Association ("VESA") local bus, and Peripheral Component Interconnect ("PCI") bus, which can be implemented as a Mezzanine bus manufactured to the IEEE P1386.1 standard.

Processing unit 804, which can be implemented as one or more integrated circuits (e.g., a conventional microprocessor or microcontroller), controls the operation of computer system 800. One or more processors may be included in processing unit 804. These processors may include single core or multicore processors. In certain embodiments, processing unit 804 may be implemented as one or more independent processing units 832 and/or 834 with single or multicore processors included in each processing unit. In other embodiments, processing unit 804 may also be implemented as a quad-core processing unit formed by integrating two dual-core processors into a single chip.

In various embodiments, processing unit 804 can execute a variety of programs in response to program code and can maintain multiple concurrently executing programs or processes. At any given time, some or all of the program code to be executed can be resident in processor(s) 804 and/or in storage subsystem 818. Through suitable programming, processor(s) 804 can provide various functionalities described above. Computer system 800 may additionally include a processing acceleration unit 806, which can include a digital signal processor ("DSP"), a special-purpose processor, and/or the like.

I/O subsystem 808 may include UI input devices and UI output devices. UI input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. UI input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. UI input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, UI input devices may include voice recognition sensing devices that enable users to interact with voice recognition systems (e.g., Siri® navigator), through voice commands.

UI input devices may also include, without limitation, three dimensional ("3D") mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, UI input devices may include, for example, medical imaging input devices such as computed tomography, magnetic resonance imaging, position emission tomography, medical ultrasonography devices. UI input devices may also include, for example, audio input devices such as MIDI keyboards, digital musical instruments and the like.

UI output devices may include a display subsystem, indicator lights, or non-visual displays such as audio output devices, etc. The display subsystem may be a cathode ray tube ("CRT"), a flat-panel device, such as that using a liquid crystal display ("LCD") or plasma display, a projection device, a touch screen, and the like. In general, use of the term "output device" is intended to include all possible types of devices and mechanisms for outputting information from computer system 800 to a user or other computer. For example, UI output devices may include, without limitation, a variety of display devices that visually convey text, graphics and audio/video information such as monitors, printers, speakers, headphones, automotive navigation systems, plotters, voice output devices, and modems.

Computer system 800 may comprise a storage subsystem 818 that comprises software elements, shown as being currently located within a system memory 810. System memory 810 may store program instructions that are loadable and executable on processing unit 804, as well as data generated during the execution of these programs.

Depending on the configuration and type of computer system 800, system memory 810 may be volatile (such as random access memory ("RAM")) and/or non-volatile (such as read-only memory ("ROM"), flash memory, etc.) The RAM typically contains data and/or program modules that are immediately accessible to and/or presently being operated and executed by processing unit 804. In some implementations, system memory 810 may include multiple different types of memory, such as static random access memory ("SRAM") or dynamic random access memory ("DRAM"). In some implementations, a basic input/output system ("BIOS"), containing the basic routines that help to transfer information between elements within computer system 800, such as during start-up, may typically be stored in the ROM. By way of example, and not limitation, system memory 810 also illustrates application programs 812, which may include client applications, Web browsers, mid-tier applications, relational database management systems ("RDBMS"), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 818 may also provide a tangible computer-readable storage medium for storing the basic programming and data constructs that provide the functionality of some embodiments. Software (programs, code modules, instructions) that when executed by a processor provide the functionality described above may be stored in storage subsystem 818. These software modules or instructions may be executed by processing unit 804. Storage subsystem 818 may also provide a repository for storing data used in accordance with the present invention.

Storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for temporarily and/or more permanently containing, storing, transmitting, and retrieving computer-readable information.

Computer-readable storage media 822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM ("EEPROM"), flash memory or other memory technology, CD-ROM, digital versatile disk ("DVD"), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 800.

By way of example, computer-readable storage media 822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 822 may include, but is not limited to, Zip® drives, flash memory cards, universal serial bus ("USB") flash drives, secure digital ("SD") cards, DVD disks, digital video tape, and the like. Computer-readable storage media 822 may also include, solid-state drives ("SSD") based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM ("MRAM") SSDs, and hybrid SSDs that use a combination of DRAM and flash memory based SSDs. The disk drives and their associated computer-readable media may provide non-volatile storage of computer-readable instructions, data structures, program modules, and other data for computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to connect to one or more devices via the Internet. In some embodiments communications subsystem 824 can include radio frequency ("RF") transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system ("GPS") receiver components, and/or other components. In some embodiments communications subsystem 824 can provide wired network connectivity (e.g., Ethernet) in addition to or instead of a wireless interface.

In some embodiments, communications subsystem 824 may also receive input communication in the form of structured and/or unstructured data feeds 826, event streams 828, event updates 830, and the like on behalf of one or more users who may use computer system 800.

By way of example, communications subsystem 824 may be configured to receive data feeds 826 in real-time from users of social networks and/or other communication services such as Twitter® feeds, Facebook® updates, web feeds such as Rich Site Summary ("RSS") feeds, and/or real-time updates from one or more third party information sources.

Additionally, communications subsystem 824 may also be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Adaptive Data Transfer Optimization

Generally, some known client-server systems transfer data in fixed amounts. This may be appropriate for some network/server configurations/conditions, but less efficient for others. For example, in a low latency network, there is less overhead for each request-response cycle that is completed to transfer a fixed amount of data, therefore transferring data in fixed amounts may provide desirable performance. However, as network latency grows, the cost of each request-response cycle also grows and may cause the transfer of data in fixed amounts to be inadequate for providing acceptable performance.

While transferring data in fixed amounts may be inefficient, the known systems either simply operate under such inefficiency, or provide administrators with various tuning controls. For example, an administrator may be provided with the ability to change/adjust the size of data packets that are transferred. Alternatively and/or additionally, an administrator may be provided with the ability to change/adjust the amount of time allotted to the transfer of each data packet. However, these administrators rarely have enough information to optimally tune a system. More importantly, network conditions are not always static. For example, network bandwidth and latency can fluctuate over time, and such fluctuations can render manual tuning ineffective.

In contrast to the known systems, embodiments optimize the data flow between client and server components in an adaptive, real time manner to improve the efficiency of data transfer across disparate network conditions. In one embodiment, the need for manual tuning is eliminated by automatically performing continuous adaptive tuning in real time during the data transfer process. In one embodiment, for each particular use case and network, relevant results (e.g., transfer time) are measured after each data transfer and adjustments are made to the next data transfer until an optimal balance is found for that particular use case in that particular network. Accordingly, embodiments increase performance of data transfers and reduce the need/cost of system administration.

One embodiment implements adaptive data transfer optimization in ADFdi. For example, when ADFdi is used to provide an Excel interface on top of hosted business services (such as financial services), there may be significant networking costs for syncing large volumes of data between a user machine and a server. In known systems, configurations such as transfer sizes are usually statically configured (if configurable at all). However, one embodiment provides a constantly self-tuning algorithm for monitoring and adapting the sizes of request payloads that are sent or received. Accordingly, embodiments achieve the maximum throughput for each particular network configuration and condition.

Embodiments are also applicable to other client-server systems such as browser-server systems where large amounts of data are transferred. Embodiments are also applicable to JavaScript based applications. For example, in frameworks or applications that implement and/or use large JavaScript libraries, optimizing the download of such libraries from a server to a client is advantageous. Embodiments are also applicable to applications that are based on JavaScript Object Notation ("JSON"). JSON is a data interchange format. For example, for JSON based applications where data volumes prohibit sending the full load in one shot, embodiments may be applied to allow for improved data transfer.

Upload Performance

Generally, in database systems, a "transaction" refers to an atomic set of operations performed against a database. Atomic operations are operations that complete in a single step relative to other threads that work with a shared variable or data. A transaction may access, create, modify, or delete database data or database metadata while it is being processed. A "commit" occurs when the transaction has completed its processing and any changes to the database by the transaction are ready to be permanently implemented in the database system. Because a transaction is atomic, all actions taken by the transaction must be committed at the same time. If any operation taken by the transaction cannot be performed, then the entire transaction must be aborted—not just the particular operation that failed. When the transaction is aborted, any changes made by that transaction to the database are "rolled back" such that the database is returned to its pre-existing state from immediately prior to the aborted transaction.

In some known systems, a transactional system may be implemented to upload large amounts of data. For example, large data may be split into smaller "batches" of data and then each batch may be uploaded to a server by sending one or more corresponding requests to the server. For example, for uploading a table of 1000 rows of data, the batch size may be configured such that each batch includes 100 rows of data in the table.

During a typical upload operation, each batch of rows of data is uploaded by making two requests to the server: a first request to "upload" the batch to the server, and a second request to "commit" the changes at the server. Each request represents a distinct operation that must be processed as a single unit-of-work on the server. For example, for a table upload of 1000 rows and a batch size configured to be 100 rows, there will be 20 web requests (10 batches of 100 rows, times 2 requests per batch).

Figure 9:
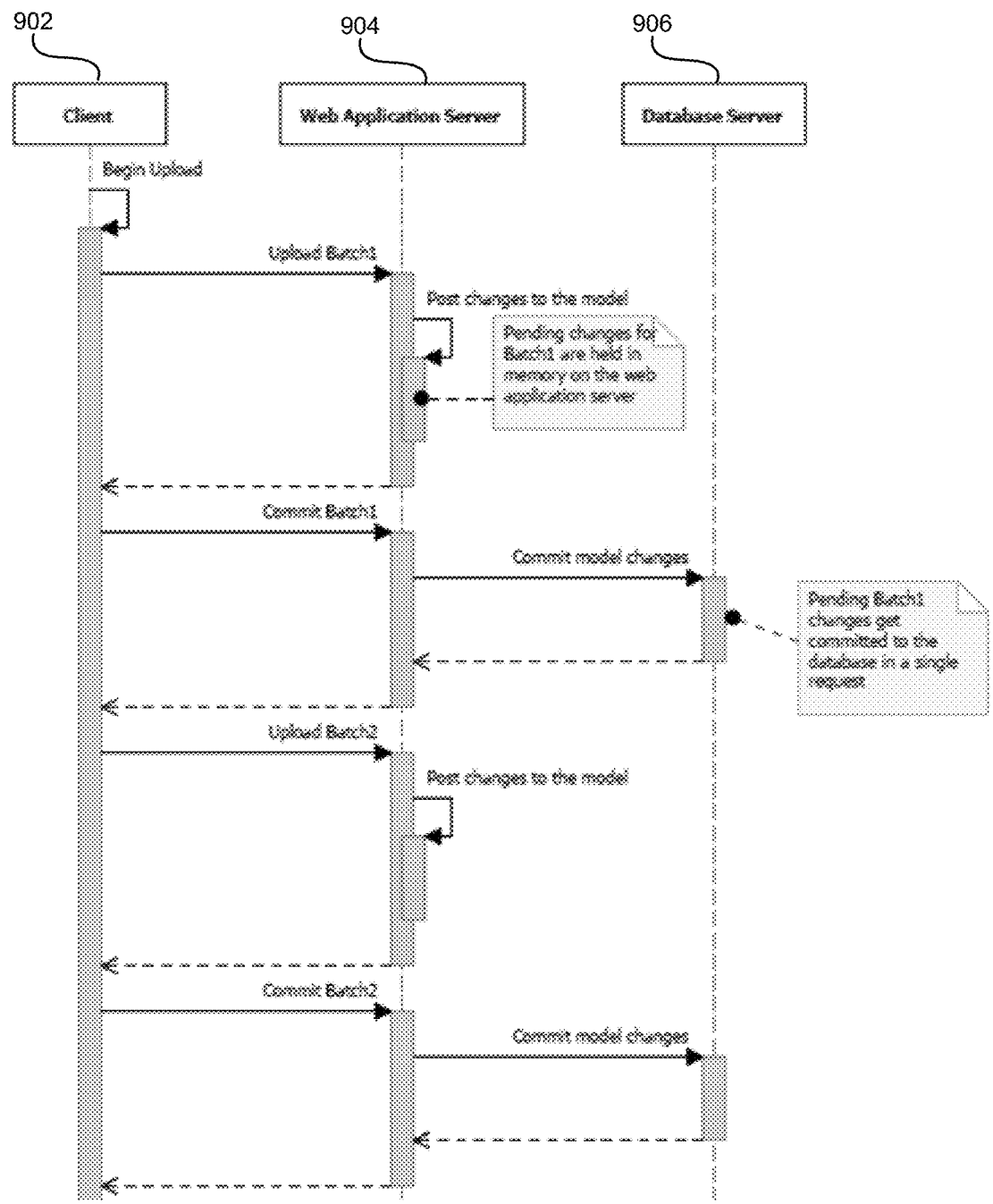
FIGS. 9-12 illustrate example message sequence diagrams for data transfer according to some embodiments.

FIG. 9 illustrates an example message sequence diagram for such upload operation between a client 902, a web application server 904, and a database server 906. Client 902 begins the upload operation by sending an upload request to web application server 904 for uploading a first batch of data. Web application server 904 receives the request, posts changes to a corresponding model, and sends a response back to client 902. At this time, pending changes to the first batch of data are held in a memory at web application server 904.

Client 902 then sends a commit request to web application server 904 for committing the changes to the first batch of data. Web application server 904 receives the commit request and commits the corresponding model changes to database server 906 by sending a corresponding request to database server 906 and receiving a corresponding response. At this time, pending changes to the first batch of data are committed to the database in a single request, and web application server 904 sends a response to client 902 to indicate completion of the commit operation. If there are more batches of data, client 902 repeats similar upload and commit requests for each batch.

Due to the transactional nature of such uploading operation, the batch size affects the upload performance. A batch size that is too small results in inefficiencies due to increased number of required messaging, while a batch size that is too large results in inefficiencies when a batch is not properly uploaded and therefore data in the entire batch needs to be rolled back.

However, one embodiment addresses such inefficiencies by adaptively adjusting the batch size to improve performance. For example, when the client is connected to a web application over a high latency network and/or when each web request incurs a fixed cost or "overhead" in addition to the cost of transmitting the payload, one embodiment improves the performance by reducing the number of requests made during an upload operation.

Alternatively or additionally, one embodiment avoids multiple requests per batch by specifying distinct operations within a single "multi-sync" request. Multi-sync refers to the synchronization of multiple rows of data between the client and the server in a single request. For example, rather than making multiple requests per batch, a single request is configured to include the batch of uploaded row data (as one operation) as well as the commit action (as a separate operation).

Alternatively or additionally, one embodiment processes multiple batches within a single multi-sync request. For example, in order to upload a table of 1000 rows of data with a batch size configured to include 100 rows, one embodiment sends only one web request that implements 10 batch requests of 100 rows within a single request. Accordingly, this embodiment improves performance due to a reduced number of web requests made during table upload operations, particularly over a high latency connection.

Figure 10:
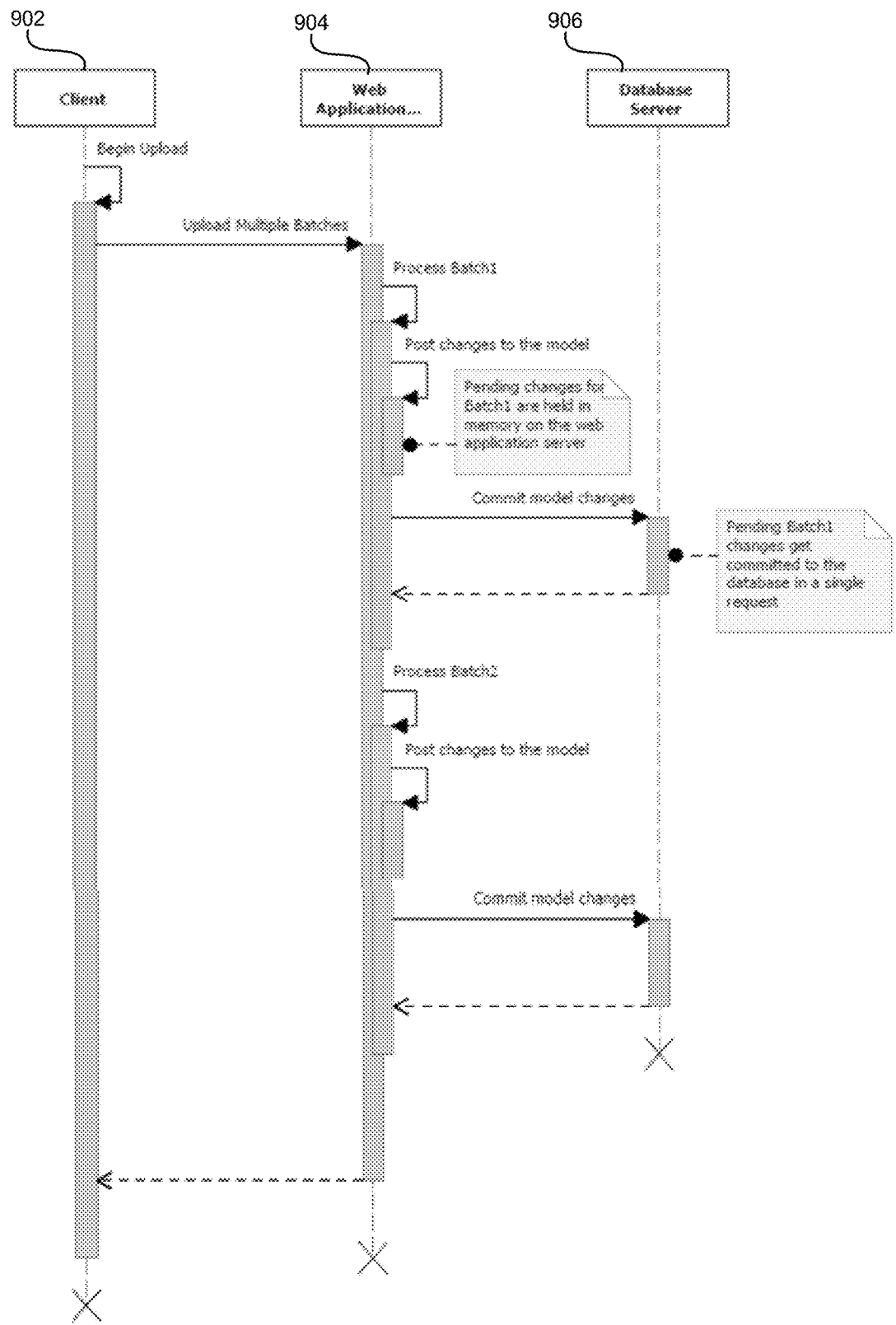

FIG. 10 illustrates an example message sequence diagram for such upload operation between client 902, web application server 904, and database server 906. Client 902 begins the upload operation by sending an upload request to web application server 904 for uploading multiple batches of data. Web application server 904 receives the request and processes and commits each batch in the multiple batches of data before sending a response to client 902. More specifically, web application server 904 first processes the first batch of data, posts changes to a corresponding model, and commits the changes to database server 906 by sending a request to database server 906 and receiving a corresponding response. Web application server 906 then similarly processes subsequent batches of data until all batches have been processed and committed, and then sends a response back to client 902.

One embodiment introduces public application programming interfaces ("APIs") that enable consumers to identify distinct operations within a single multi-sync request. For example, one embodiment implements a "public void BindingContainer.BeginMultiSyncOperation (String operationName)" API which is valid after API "BindingContainer.BeginMultiSync" has been called. An API may be called according to the following example functionality that sends a single request to the server for multiple operations:

BindingContainer.BeginMultiSync
BindingContainer.BeginMultiSyncOperation("batch1: upload rows")
[post row-level changes for the first batch of rows]
BindingContainer.BeginMultiSyncOperation("batch1: commit")
[post commit action (to commit first batch of rows)]
BindingContainer.BeginMultiSyncOperation("batch2: upload rows")
[post row-level changes for the second batch of rows]
BindingContainer.BeginMultiSyncOperation("batch2: commit")
[post commit action (to commit second batch of rows)]
BindingContainer.EndMultiSync In this example functionality, a single multi-sync operation uploads and commits two batches and includes separate upload and commit operations for each batch.

One embodiment implements a servlet with a multi-sync request handler that supports distinct operations within a single multi-sync request. A servlet is a small Java program that runs within a web server and receives and responds to requests from web clients, usually across HTTP. The multi-sync request processing logic applies to each distinct operation contained within a single multi-sync request. In one embodiment, the servlet parses a multi-sync operation into separate upload/commit operations and processes the parsed operations individually as if they were sent to the server as individual requests.

One embodiment implements a table upload algorithm that computes how many batches are included in a single multi-sync request and then includes the batches of row data and corresponding upload and commit actions within the multi-sync request. In one embodiment, the number of batches per multi-sync request may be limited to a maximum in order to avoid significant memory consumption. In one embodiment, the number of batches per multi-sync request may be computed based on the amount of data to be uploaded. For example, in one embodiment with an initial limit of 4000 on the pieces of data uploaded per request, the limit is first increased from 4000 to 40000, and then the number of rows uploaded per multi-sync request will be 40000 divided by the number of columns in the table.

In one embodiment, if the number of rows to be uploaded within a single batch exceeds a computed memory limitation (for example, the upload operation is limited to a maximum of 50000 rows in a single batch), the batch of rows is processed in multiple requests.

Download Performance

In some known systems, when downloading a table of data, each request is limited to a certain amount of data (e.g., 4000 pieces of data). For example, the number of rows of data downloaded per request may be limited to 4000 divided by the number of table columns. Accordingly, the number of web requests grows with the size of the data set. For example, downloading a table of 5000 rows and 20 columns requires 25 requests, downloading a table of 50000 rows and 20 columns requires 250 requests, etc.

Figure 11:
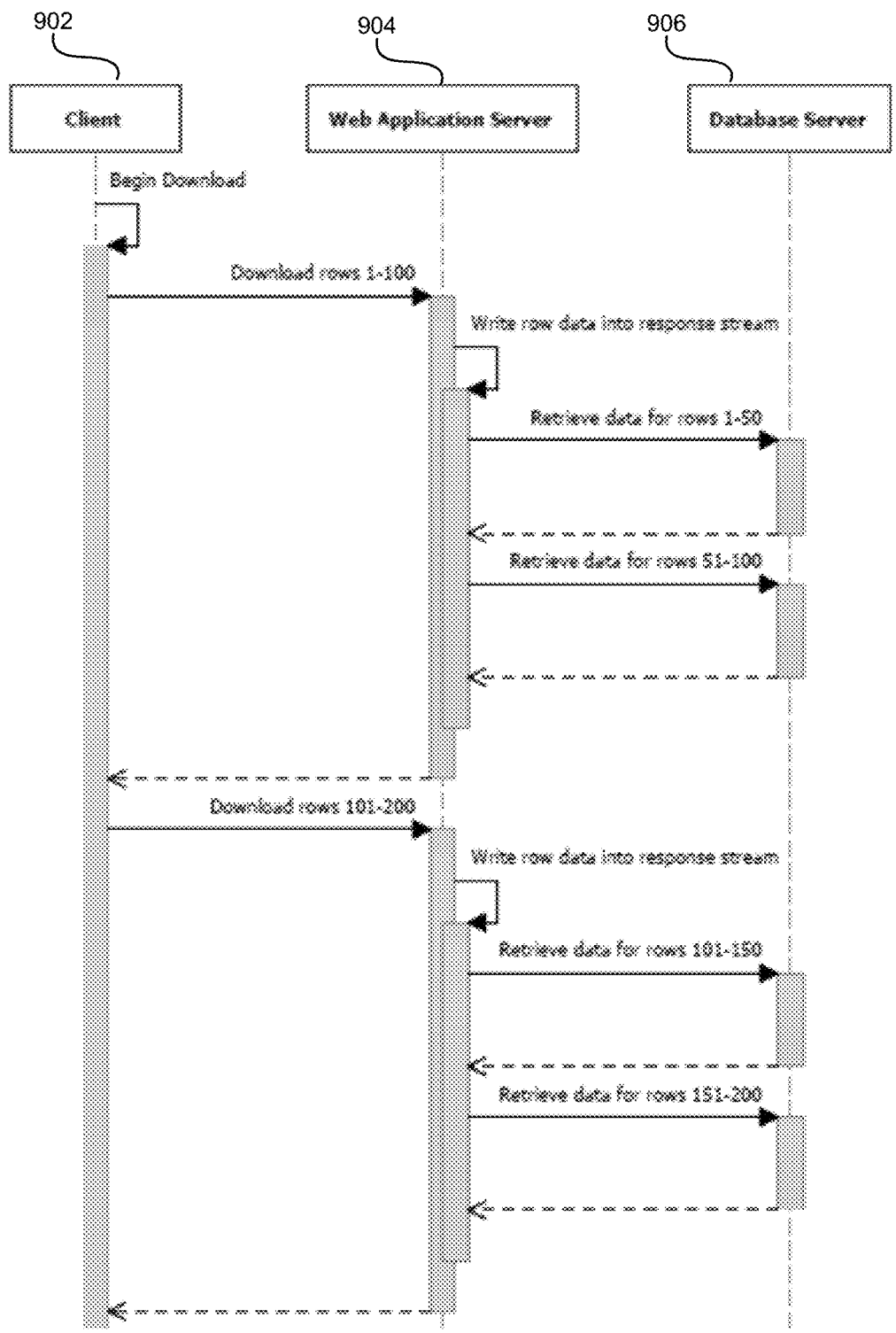

FIG. 11 illustrates an example message sequence diagram for a download operation between client 902, web application server 904, and database server 906. In this example, each download request is limited to 100 rows of data. Client 902 begins the download operation by sending a download request to web application server 904 for downloading rows 1-100 of data. Web application server 904 receives the request, retrieves rows 1-50 of data from database server 906, then retrieves rows 51-100 of data from database server 906, and finally sends a response to client 902 with the retrieved rows of data. That is, web application server 904 retrieves data from database server 906 50 rows at a time. The same process is repeated if client 902 needs to download more rows of data (e.g., rows 101-200).

When such a download operation is performed across a system running all three tiers (i.e., client, web application server, and database) on a single machine, the network latency may be negligible (e.g., very low). Therefore, the number of requests may not greatly influence the overall performance. However, when the three tiers are on two or more different machines, network latency between the machines begins to incur overhead to each request. Therefore, the total number of requests begins to matter and affect the overall performance.

Accordingly, one embodiment reduces the number of requests made during a download operation, thus resulting in improved performance when a client is connected to a web application over a high latency network. One embodiment significantly increases the amount of data retrieved in each request during a download operation. For example, the limit on the number of rows downloaded per request may be increased from 4000 to 40000 pieces of data.

Figure 12:
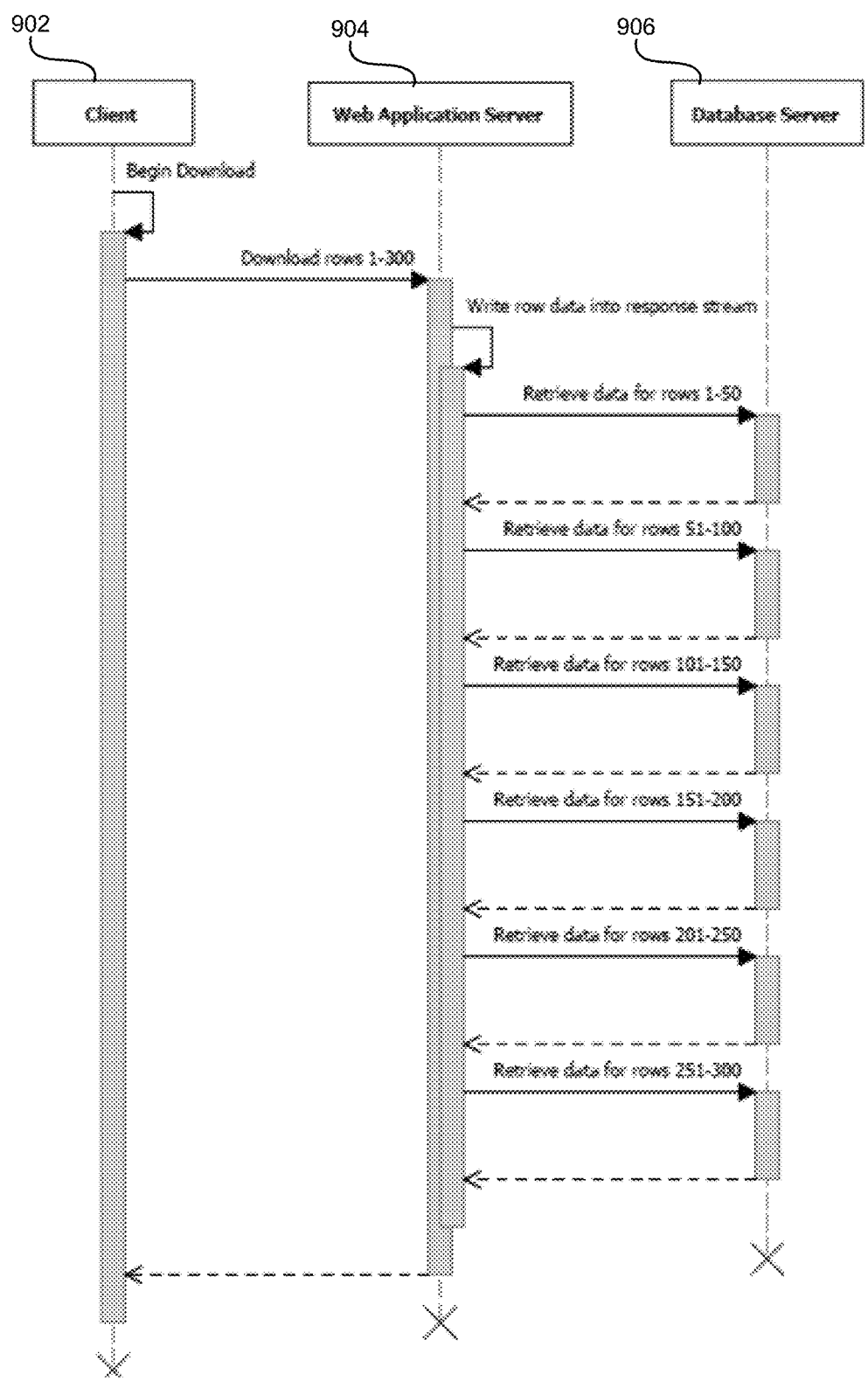

FIG. 12 illustrates an example message sequence diagram for such download operation between client 902, web application server 904, and database server 906. Compared to the example of FIG. 11, the limit on each download request in this example is increased to 300 rows of data. Client 902 begins the download operation by sending a download request to web application server 904 for downloading rows 1-300 of data. Web application server 904 receives the request, retrieves rows 1-50 of data from database server 906, then retrieves rows 51-100 of data from database server 906, and similarly continues retrieving 50 rows of data at a time until rows 1-300 are all retrieved. Web application server 904 then sends a response to client 902 with the retrieved rows of data.

Further, in one embodiment, both the client processing and the server processing of download requests/responses will stream content (the request payload including data and/or metadata) directly to/from the server whenever possible to minimize the overall memory consumption. "Streaming" refers to the functionality that when the first piece of data is ready, it is sent without waiting for the next piece of data to be prepared. Accordingly, as soon as the first piece of data is sent, it may be discarded by the sender to free up memory. Further, the receiver may start processing immediately. In this embodiment, streaming occurs within a single request. Streaming contrasts with the simpler and less efficient approach of preparing the entire request payload before sending any of it.

Similar to the embodiments described herein with reference to upload operations, one embodiment implements multi-sync functionality for download operations. In one embodiment, the number of rows downloaded per multi-sync request is 40000 divided by the number of table columns. In one embodiment, during multi-sync (batch) processing, the APIs and the servlet do not hold onto uncompressed request and response content. Instead, request data is written/read directly to/from a compressed stream, and response data is read/written directly from/to a compressed response stream. In this embodiment, the request and response payloads are compressed. Compression may be performed according to the industry standard zip compression.

For example, when evaluating employee compensations via a web application such as "Oracle Human Capital Management" ("HCM"), instead of looking at employee records one by one, embodiments allow a manager to download a list of employees and their information (e.g., a Microsoft Excel list), including key performance data, previous/current compensation information, etc. The manager may then indicate possible compensation adjustments for the employees and upload the table back into the web application. Embodiments are similarly applicable to other web applications in other human resources ("HR") systems, accounting systems, finance systems, etc.

Changing Data Size Adaptively

In some known systems, when uploading/downloading data, a client uses a fixed upper limit (for example, 1 megabyte) for the amount of data sent between the client and server on each request (e.g., an HTTP request or a request according to any other applicable network protocol). However, when there is a per request overhead, particularly over a high latency network connection, one embodiment implements an adaptive algorithm to automatically adjust the amount of data sent per request in order to achieve optimal performance. For example, in one embodiment, a batch size and/or a multi-sync size configured for making upload, download, and/or commit requests is adaptively changed to improve performance.

For example, when uploading 100 megabytes of data from a client to a server, a known system may configure the client to make 100 requests (each transmitting 1 megabyte of data), taking 100 seconds in total (1 megabyte per second). However, rather than using a fixed per request maximum data size, in one embodiment the client programmatically determines the optimal per request data size based on network throughput and available memory. For example, the client may change the per request data size according to the following functionality:

HTTP request #1: sending 1 megabyte takes 1 second (1.0 megabytes/second)

HTTP request #2: sending 2 megabytes takes 1.6 seconds (0.8 megabytes/second)

HTTP request #3: sending 4 megabytes takes 2.4 seconds (0.6 megabytes/second)

HTTP request #4: sending 6 megabytes takes 4.2 seconds (0.7 megabytes/second)

HTTP request #5 (and beyond): sending 4 megabytes takes 2.4 seconds (0.6 megabytes/second)

In this functionality, the fourth HTTP request is processed slower (e.g., due to client/server memory contention). After the fourth HTTP request, the client determines that sending 4 megabytes per HTTP request will achieve the best performance and sends only 25 requests (rather than 100 requests) to transmit the entire 100 megabytes of data to the server. Accordingly, rather than 100 HTTP requests in 100 seconds, the client sends about 25 HTTP requests in 15 seconds (about 25 requests at 0.6 seconds per request).

Figure 13:
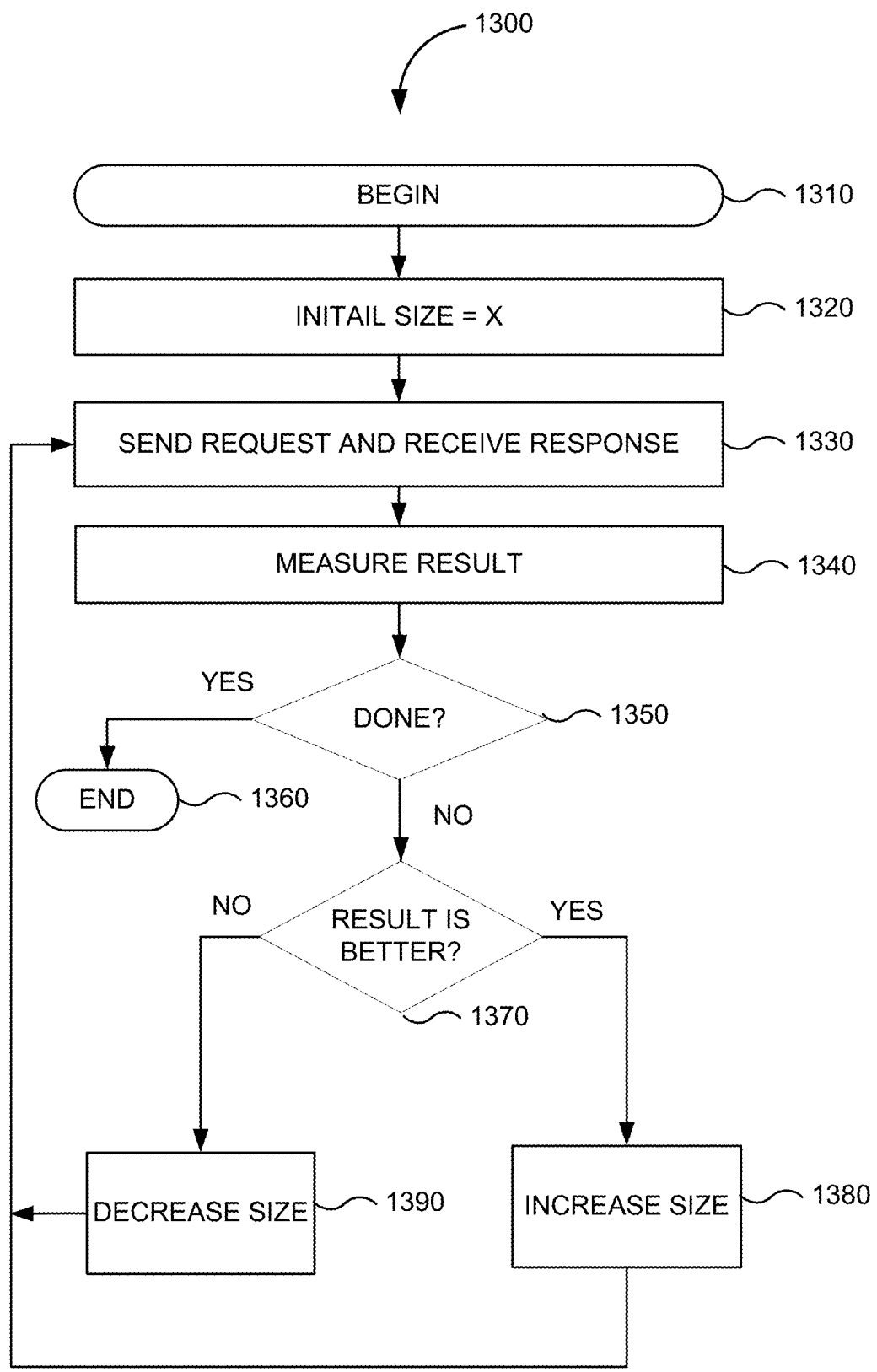
FIGS. 13 and 14 are flowcharts of example methods for adaptive data transfer optimization according to some embodiments.

FIG. 13 is an example flowchart of functionality for adaptive data transfer optimization according to some embodiments. At 1310 the functionality begins and at 1320 the initial per request data size is determined. For example, if there is a memory constraint in an embodiment, all data/payload sizes must conform to that constraint, and the initial per request data size is determined accordingly. For example, the initial per request data size may be selected to be less than or equal to a server memory constraint. However, not all embodiments have a memory constraint. For example, one embodiment may have a per request time constraint. Another potential constraint is bandwidth (e.g., megabytes/second). In one embodiment, the initial size is a fixed value deemed to be "safe" and also deemed to be "useful" for establishing the baseline measurement. In one embodiment, the initial size is pre-configured.

At 1330 a request is sent and a corresponding response is received. At 1340 a result related to the completion of 930 is measured. In one embodiment, the result is the time it takes to send the request and/or receive the response.

At 1350 it is determined whether there is a need for executing further requests and receiving corresponding responses (e.g., there is more data to be uploaded/downloaded). If not, at 1360 the method ends. If there are more requests to be executed, at 1370 it is determined whether the result obtained at 940 indicates an improvement over a previous value of such result. For example, in one embodiment, an improvement is indicated if the execution of the request/response takes less time compared to a previous request/response. If yes, at 1380 the per request data size is further increased (e.g., by 10%) and the method loops back to 1330. If the result obtained at 1340 indicates no such improvement, at 1390 the per request data size is decreased (e.g., by 10%) and the method loops back to 1330.

Figure 14:
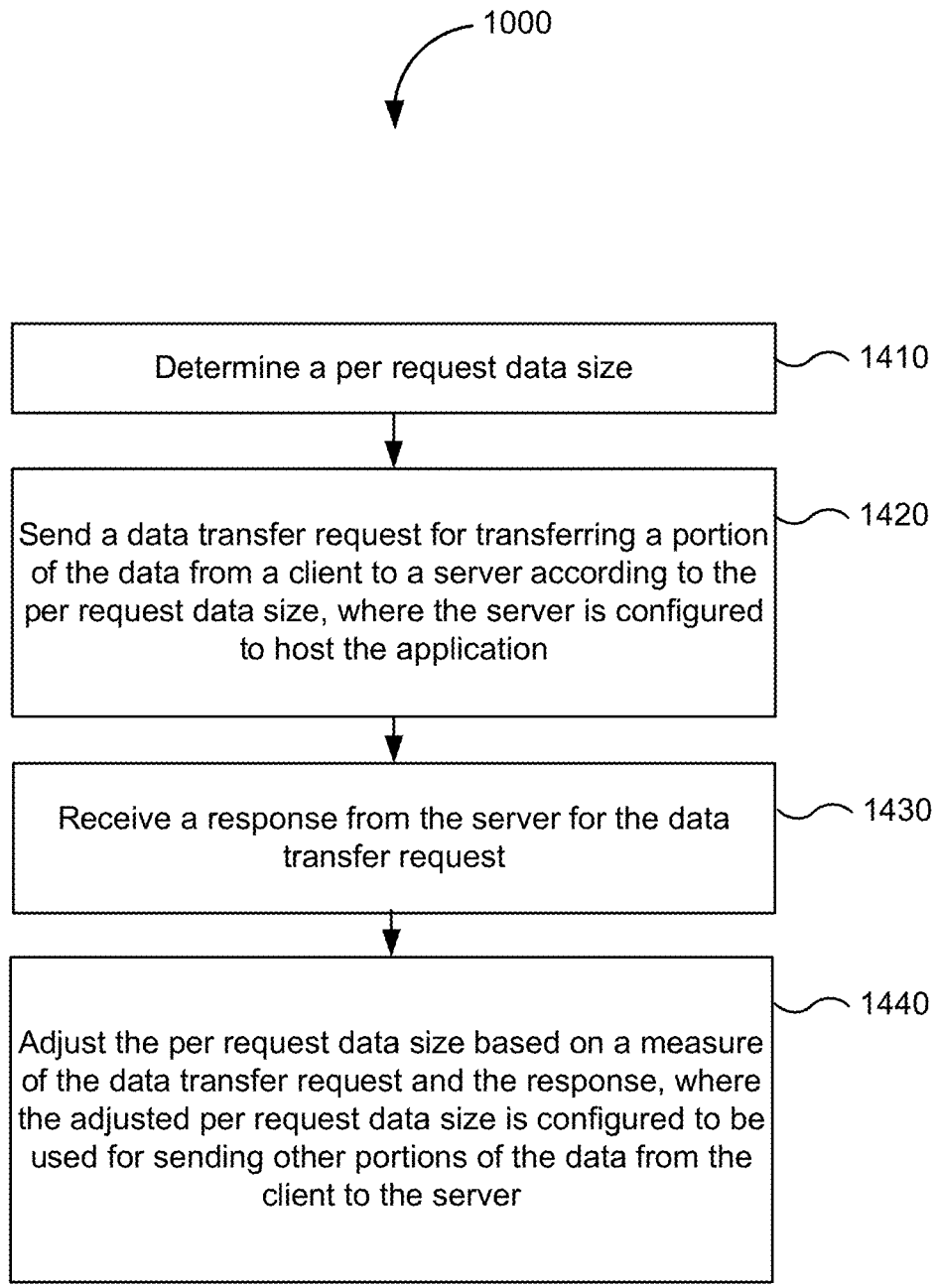

FIG. 14 is an example flowchart of a functionality for transferring data for an application according to some embodiments. At 1410 a per request data size is determined. In one embodiment, the data includes a table, and the per request data size indicates a number of rows in the table.

At 1420 a data transfer request for transferring a portion of the data is sent from a client to a server according to the per request data size, where the server is configured to host the application. In one embodiment, the application is developed on the client and implements the data. In one embodiment, the application is executed on the client and updates the data. In one embodiment, the application is integrated with a native application at the client, wherein the data is configured by the native application. The native application may be a desktop based application. For example, the native application may be Microsoft Excel, in which case the data is configured in a spreadsheet.

In one embodiment, the data transfer request is configured to persist changes in a model of the data at the server. In one embodiment, the data transfer request includes one or more upload or download requests. In one embodiment, the data transfer request further includes one or more commit requests.

In one embodiment, the portion is a batch of data, the per request data size indicates a batch size for the batch of data, and the data is split into batches of the batch size. In one embodiment, the data transfer request implements multi-sync functionality to upload or download multiple batches of data in a single request. The multi-sync functionality may be implemented by an API that includes multiple upload or download requests and multiple commit requests.

At 1430 a response is received from the server for the data transfer request, and at 1440 the per request data size is adjusted based on a measure of the data transfer request and the response, where the adjusted per request data size is configured to be used for sending other portions of the data from the client to the server. In one embodiment, the measure is an amount of time between the sending of the data transfer request and the receiving of the response. In one embodiment, the per request data size is reduced when the amount of time indicates that a network latency is above a threshold value or above a previously measured latency value. In one embodiment, the per request data size is increased when the amount of time indicates that a network latency is below a threshold value or below a previously measured latency value.

As disclosed, embodiment implement an adaptive algorithm that adjusts the per request data size for upload and/or download operations to improve performance. One embodiment significantly increases the amount of data uploaded/downloaded in each request during an upload/download operation, thus significantly reducing the total number of requests needed to upload/download the data. One embodiment allows for multi-sync functionality to use a single request for uploading/downloading multiple batches of data. Accordingly, embodiments result in more efficient use of network/server resources as network/server conditions change.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to transfer data for an application, the transferring comprising:
    determining a first per request data size, wherein the data comprises a database table of a database comprising a plurality of rows, and the first per request data size comprises a first number of the plurality of the rows;
    sending a first data transfer request of a plurality of data transfer requests for transferring a first portion of the data from a client to a server according to the first per request data size, each of the plurality of data transfer requests comprising transferring a portion of the data from the client to the server and the server committing the transferred data, the committing comprising storing the first number of rows into the database, the first portion having the first per request data size;
    receiving a response from the server for the first data transfer request, the response indicating a completion of a data transfer request and indicating both that the first number of rows are received by the server and the first number of rows are stored in the database; and
    adjusting the first per request data size based on a measure of the data transfer request and the response to generate a second per request data size that is different than the first per request data size, the second per request data size comprises a second number of the plurality of rows, the measure comprising a time duration between the data transfer request and the response, wherein the second per request data size is configured to be used for sending other portions of the data from the client to the server;
    sending a second data transfer request for transferring a second portion of the data from a client to a server according to the second per request data size, the second data transfer request comprising transferring a second portion of the data, the second portion having the second per request data size.

2. The computer readable medium of claim 1, wherein the application is developed on the client and implements the data.

3. The computer readable medium of claim 1, wherein the application is executed on the client and updates the data.

4. The computer readable medium of claim 1, wherein the application is integrated with a native application at the client, wherein the data is configured by the native application.

5. The computer readable medium of claim 4, wherein the native application is a desktop based application.

6. The computer readable medium of claim 4, wherein the native application is Microsoft Excel, wherein the data is configured in a spreadsheet.

7. The computer readable medium of claim 1, wherein the data transfer request is configured to persist changes in a model of the data at the server.

8. The computer readable medium of claim 1, wherein the data transfer request comprises one or more upload or download requests.

9. The computer readable medium of claim 1, wherein the first per request data size is reduced when the time duration indicates that a network latency is above a threshold value or above a previously measured latency value.

10. The computer readable medium of claim 1, wherein the first per request data size is increased when the time duration indicates that a network latency is below a threshold value or below a previously measured latency value.

11. The computer readable medium of claim 1, wherein the portion is a batch of data, wherein the first per request data size indicates a batch size for the batch of data, wherein the data is split into batches of the batch size.

12. The computer readable medium of claim 11, wherein the first data transfer request implements multi-sync functionality to upload or download multiple batches of data in a single request.

13. The computer readable medium of claim 12, wherein the multi-sync functionality is implemented by an application programming interface that includes multiple upload or download requests and multiple commit requests.

14. A method of transferring data for an application, comprising:
    determining a first per request data size, wherein the data comprises a database table of a database comprising a plurality of rows, and the first per request data size comprises a first number of the plurality of the rows;
    sending a first data transfer request of a plurality of data transfer requests for transferring a first portion of the data from a client to a server according to the first per request data size, each of the plurality of data transfer requests comprising transferring a portion of the data from the client to the server and the server committing the transferred data, the committing comprising storing the first number of rows into the database, the first portion having the first per request data size;
    receiving a response from the server for the first data transfer request, the response indicating a completion of a data transfer request and indicating both that the first number of rows are received by the server and the first number of rows are stored in the database; and
    adjusting the first per request data size based on a measure of the data transfer request and the response to generate a second per request data size that is different than the first per request data size, the second per request data size comprises a second number of the plurality of rows, the measure comprising a time duration between the data transfer request and the response, wherein the second per request data size is configured to be used for sending other portions of the data from the client to the server;
    sending a second data transfer request for transferring a second portion of the data from a client to a server according to the second per request data size, the second data transfer request comprising transferring a second portion of the data, the second portion having the second per request data size.

15. The method of claim 14, wherein the application is developed on the client and implements the data.

16. The method of claim 14, wherein the application is executed on the client and updates the data.

17. The method of claim 14, wherein the data transfer request implements multi-sync functionality to upload or download multiple batches of data in a single request.

18. The method of claim 14, wherein the multi-sync functionality is implemented by an application programming interface that includes multiple upload or download requests and multiple commit requests.

19. A system for transferring data for an application, comprising:
one or more processors that execute stored instructions to implement a plurality of modules, the modules comprising:
a determining module that determines a first per request data size, wherein the data comprises a database table of a database comprising a plurality of rows, and the first per request data size comprises a first number of the plurality of the rows;
a sending module that sends a first data transfer request of a plurality of data transfer requests for transferring a first portion of the data from a client to a server according to the first per request data size, each of the plurality of data transfer requests comprising transferring a portion of the data from the client to the server and the server committing the transferred data, the committing comprising storing the first number of rows into the database, the first portion having the first per request data size;
a receiving module that receives a response from the server for the first data transfer request, the response indicating a completion of a data transfer request and indicating both that the first number of rows are received by the server and the first number of rows are stored in the database; and
an adjusting module that adjusts the first per request data size based on a measure of the data transfer request and the response to generate a second per request data size that is different than the first per request data size, the second per request data size comprises a second number of the plurality of rows, the measure comprising a time duration between the data transfer request and the response, wherein the second per request data size is configured to be used for sending other portions of the data from the client to the server;
the adjusting module further sending a second data transfer request for transferring a second portion of the data from a client to a server according to the second per request data size, the second data transfer request comprising transferring a second portion of the data, the second portion having the second per request data size.

20. The system of claim 19, wherein the data transfer request implements multi-sync functionality to upload or download multiple batches of data in a single request.

* * * * *